(12) United States Patent
Nobumoto et al.

(10) Patent No.: US 6,217,477 B1
(45) Date of Patent: *Apr. 17, 2001

(54) AUTOMATIC TRANSMISSION CONTROL SYSTEM

(75) Inventors: Hidetoshi Nobumoto; Hiromasa Yoshida, both of Hiroshima (JP)

(73) Assignee: Mazda Motor Corporation, Hiroshima (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,690

(22) Filed: Mar. 31, 1997

(30) Foreign Application Priority Data

Mar. 29, 1996 (JP) .................................................. 8-077595
Jan. 21, 1997 (JP) .................................................. 9-008602

(51) Int. Cl.[7] .................................................. H16H 61/00
(52) U.S. Cl. .............................................. 477/43; 477/107
(58) Field of Search ............................... 477/43, 107, 121

(56) References Cited

U.S. PATENT DOCUMENTS

| | | | |
|---|---|---|---|
| 4,760,760 | * | 8/1988 | Miyawaki ............................... 477/43 |
| 5,505,671 | * | 4/1996 | Streib et al. ........................... 477/121 |
| 5,551,390 | * | 9/1996 | Tsuge et al. .......................... 477/107 |
| 5,707,313 | * | 1/1998 | Suzuki .................................... 477/43 |
| 5,711,712 | * | 1/1998 | Graf ...................................... 477/121 |

FOREIGN PATENT DOCUMENTS 61-146639   7/1986   (JP) .

* cited by examiner

Primary Examiner—Dirk Wright
(74) Attorney, Agent, or Firm—Sixbey, Friedman, Leedom & Ferguson, PC; Donald R. Studebaker

(57) ABSTRACT

An automatic transmission control system for controlling a gear ratio of an automatic transmission connected to an engine so as to bring an engine speed of rotation to a target speed of rotation predetermined according to a vehicle speed and a throttle opening of the engine. The control system includes an engine speed sensor for detecting an engine speed of rotation of the engine, a throttle opening sensor for detecting a throttle opening of a throttle of the engine, a vehicle speed sensor for detecting a vehicle speed a control mechanism for interrupting delivery of fuel to the engine while the engine speed of rotation is higher than a specified speed of rotation and the throttle opening is less than a specified opening, increasing the target engine speed of rotation while the throttle opening is less than the specified opening to increase the gear ratio and, when the trottle opening sensor detects a throttle opening increase above the specified opening after having once been decreased below the specified opening, the control mechanism controls the gear ratio according to the increased target engine speed of rotation until a target engine speed of rotation set according to the vehicle speed and a throttle opening becomes greater than the increased target engine speed of rotation.

11 Claims, 28 Drawing Sheets

TO ENGIN

CONTROL UNIT — 100

AUTOMATIC TRANSMISSION CONTROL SYSTEM

BACKGROUND OF THE INVENTION

1. Field of the Invention

The present invention relates to a control system for a continuously variable automatic transmission such as a toroidal type continuously variable automatic transmission and a pulley type continuously variable automatic transmission.

2. Description of Related Art

This kind of automatic transmission control systems controls a rotational speed input to a continuously variable transmission gear mechanism to bring it into agreement with a target rotational speed. Such a continuously variable automatic transmission control system is known from, for example, Japanese Unexamined Patent Publication No. 61-146639.

In gear shift control for the continuously variable automatic transmission which controls the gear ratio so as to bring the engine speed into agreement with a target engine speed determined in accordance with vehicle speed and engine throttle opening, when operating the engine in a zone of low engine speeds and high engine loads to meet a demand for improved fuel efficiency, it is necessary in order to drop the engine speed for the same vehicle speed to perform control to bring the transmission into a high speed transmission ratio (which is equivalent to making the gear ratio lower).

When performing the high speed transmission ratio control, in a state where the automatic transmission is on the side of high speed ratios, the engine operates at a low speed and causes only a small decrease in speed when the engine throttle fully closes in the idle position. For this reason, in the case where a fuel-cut zone is established in order to interrupt fuel delivery to the engine while the engine speed is higher than a specified speed, when the engine throttle fully closes while the automatic transmission is at a high speed ratio, a time for which the engine speed stays in the fuel cut zone is shortened due to a small decrease in engine speed. As a result, it is hard to make the best use of the fuel cut zone, and hence aggravation of fuel efficiency is encountered.

SUMMARY OF THE INVENTION

It is an object of the invention to provide an automatic transmission control system for controlling the gear ratio of an automatic transmission so as to change an engine speed toward a target engine speed established based on vehicle speed and engine throttle position in which an engine speed taken on when the engine throttle fully closes is kept to stay within the fuel cut zone as long as possible.

The above object of the invention is achieved by providing an automatic transmission control system which the target engine speed is increased with the result of causing an increase in gear ratio when the engine throttle opening becomes below a specified level, so that the engine speed remains in the fuel cut zone as long as possible.

The automatic transmission control system which controls a gear ratio of an automatic transmission to bring an engine speed of rotation to a target speed of rotation predetermined according to a vehicle speed and a throttle opening interrupts fuel delivery to the engine when the engine speed is higher than a specified speed while the throttle opening is smaller than a specified opening and increases the target engine speed to increase the gear ratio when the throttle opening is less the specified opening.

With the automatic transmission control system, even when the gear ratio is lowered to lower the engine speed for the purpose of a high transmission ratio, the target engine speed is increased when the engine throttle decrease its opening smaller than a specified opening. Accordingly, while the target engine speed falls afterward, a time for which the engine speed stays in the fuel cut zone is prolonged with an effect of improved fuel efficiency.

When a throttle opening increased above the specified opening after having once been decreased below the specified opening is detected, the gear ratio is controlled according to the increased target engine speed until the target engine speed at detection of the increased throttle opening becomes over the increased target engine speed. That is, when the vehicle is accelerated, the increased target engine speed is employed to control the gear ratio until the target engine speed at the detection of acceleration becomes higher than the increased target engine speed. As a result, it is prevented that the engine speeds falls in spite of an acceleration demand and consequently a feeling of acceleration is improved.

The control system may interrupt the control of gear ratio according to the increased target engine speed when the throttle opening is smaller than the specified opening after a predetermined period for which the throttle opening less than the specified opening is not detected. In other words, before the predetermined period of time passes from an occurrence of no detection of engine throttle opening less than the specified opening, or when the engine throttle opens greatly than the specified opening, the increased target engine speed is employed until it is exceeded by the target engine speed. However, when the predetermined period has passes while the engine throttle opens less than the specified opening, it is regarded that the vehicle is not under acceleration, then, the target engine speed is not increased. In this way, the target engine speed established according to vehicle speed and engine throttle opening is continuously employed with an effect of a smooth decrease in engine speed which improve a feeling of driving during ordinary traveling.

The control system may include a pumping loss control means to change pumping loss of the engine. The pumping loss control means causes a decrease in pumping loss of the engine when the throttle opening is less than the specified opening. Although there is an apprehension that the engine provides too strong braking effect following the fuel cut control when the target engine speed is increased with an effect of staying in the fuel cut zone as long as possible, the utilization of the pumping loss changing means prevents the engine from providing inappropriately strong braking force. The pumping loss changing means may cause a decrease in pumping loss of the engine when the vehicle speed is less than a specified speed while the throttle opening is less than the specified opening.

According to another embodiment of the invention, the control system interrupts fuel delivery to the engine when the engine speed is higher than the specified speed while the throttle opening is less than the specified opening. In this case, the target engine speed is established based on a vehicle speed and a throttle opening when a throttle opening less than the specified opening is detected, or based on a vehicle speed only when a throttle opening greater than the specified opening is detected. The later target engine speed is established so as to cause a raise in engine speed during deceleration. When the throttle opening is less than the specified opening, the target engine speed raises with en effect of increasing the gear ratio. Consequently, even in the case where the gear ratio is decreased to lower the engine speed for high speed transmission ratio, the target engine speed is increased immediately when the throttle opening falls below the specified opening. The gear ratio may be controlled according to the target engine speed established based on a vehicle speed only until target engine speed is exceeded by the target engine speed established based on both vehicle speed and throttle opening when the throttle opening increases above the specified opening after having once decreased below the specified opening, that is, when the vehicle is under acceleration. This prevents a decrease in engine speed occurring in spite of an acceleration demand, and consequently a feeling of acceleration is improved.

The control of gear ratio according to the target engine speed established based on a vehicle speed only is interrupted when the throttle opening is less than the specified opening still after a predetermined period for which no detection of throttle opening less than the specified opening is made.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote same or similar parts or elements and steps throughout the drawings, and in which.

DETAILED DESCRIPTION OF THE PREFERRED EMBODIMENTS

Figure 1:
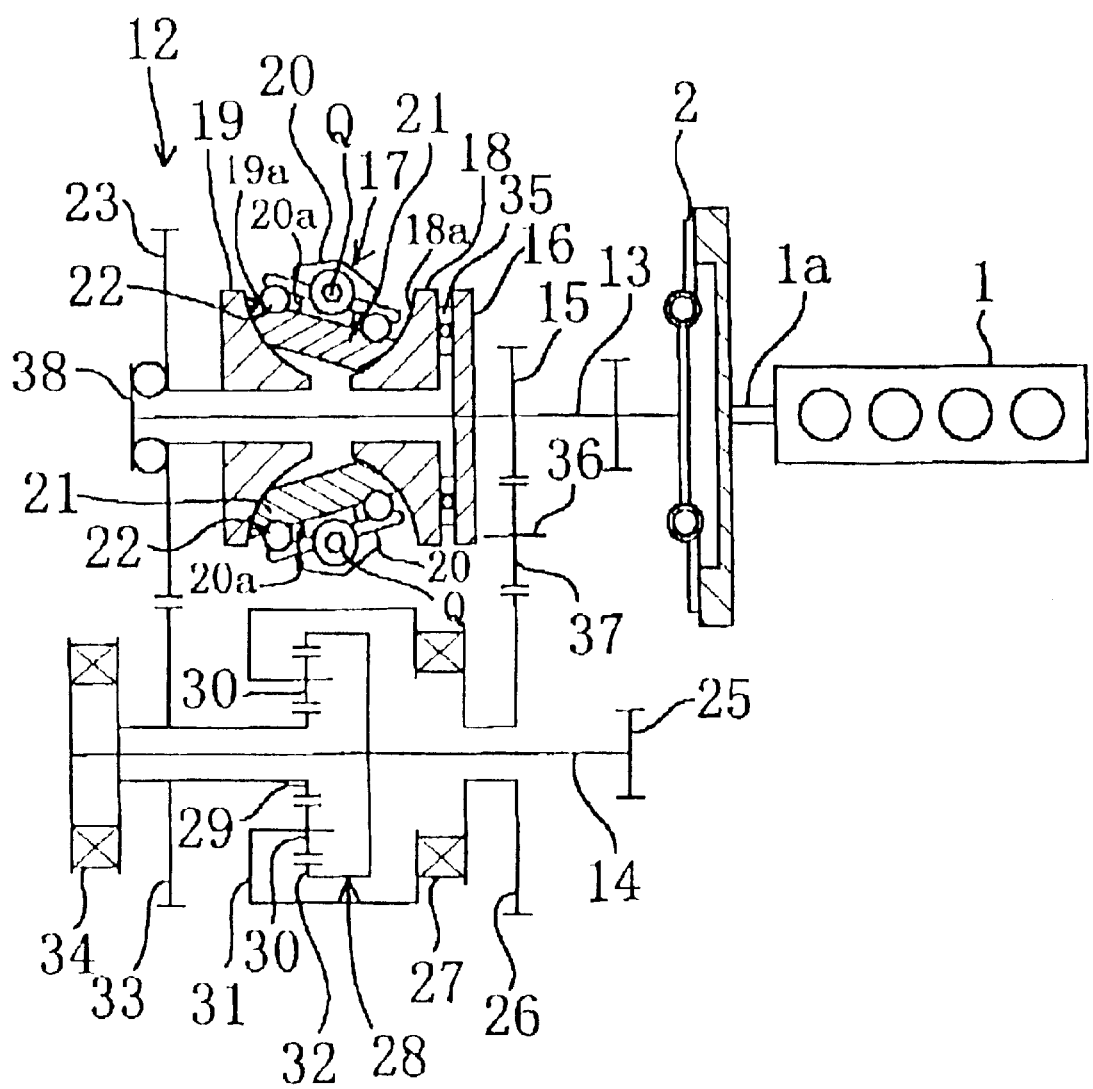
FIG. 1 is a skeleton diagram showing a toroidal type continuously variable automatic transmission equipped with a transmission control system in accordance with a specific embodiment of the invention.

Referring to the drawings in detail, in particular, to FIG. 1, a toroidal type of continuously variable automatic transmission (which is hereafter referred to as an automatic transmission for simplicity) 12 controlled by a control system of the invention is connected to an output shaft 1a of an engine 1 through an engine clutch 2. This engine 1 is of a fuel injection type having a fuel injection valve 9 (see FIG. 3) which delivers fuel into an intake manifold (not shown). The automatic transmission 12 has a transmission input shaft 13 coaxial with the engine output shaft 1a, a transmission output shaft 14 in parallel with the transmission input shaft 13, and an intermediate shaft 36 in parallel with both transmission input and output shafts 13 and 14. The output shaft 14 is connected to drive wheels (not shown) through a transmission output gear 25. The transmission input shaft 13 mounts thereon, in order from the engine 1, a first drive gear 15 and a holding disk 16, a toroidal transmission gear unit 17, and a second drive gear 23. These first drive gear 15 and holding disk 16 are fixed with respect to the transmission input shaft 13, and the second drive gear 23 is supported for rotation with respective to the transmission input shaft 13, and hence the first drive gear 15 and holding disk 16. The transmission output shaft 14 mounts thereon, in order from the engine 1, the output gear 25, a first driven gear 26, a low-clutch 27, a planetary gear set 28, a second driven gear 33, and a high-clutch 34. The transmission output gear 25 is fixed with respect to the transmission output shaft 14, and the first and second driven gears 26 and 33 are supported for rotation with respect to the transmission output shaft 14, and hence the transmission output gear 25. The transmission input shaft is provided with an end disk 38 fastened to its end to prevent the output disk 19 forced by the power rollers 21 from slipping off from the input disk 18.

The toroidal transmission unit 17 has an input disk 18 mounted for rotation on the transmission output shaft 13 on the side close to the engine 1, an output disk 19 mounted for rotation on the transmission output shaft 13 on the opposite side remote from the engine 1 with respect to the input disk 18, and a pair of power rollers 21. The input disk 18 at its back surface on the side of the engine 1 is forced against the holding disk 16 through a loading cam 35. The output disk 19 is operationally integrated with the second drive gear 23. Each power roller 21 is supported for rotation by a pivot arm 20a fastened to a support member 20 which is able to swing about a center axis Q located in a twisted position with respect to the transmission input shaft 13 and extending toward the transmission input shaft 13 (which is a center axis of rotation of the input and output disks 18 and 19). A thrust bearing 22 is held between the support 20 and the power roller 21. The power roller 21 has a peripheral surface in conformity with the toroidal surface of the input and output disks 18 and 19 and is held in frictional contact with and supported for rotation by the opposing toroidal surfaces 18a and 19a of the input and output disks 18 and 19 to transmit torque between the input and output disks 18 and 19. The power roller 21 is tilted with respect to the input and output disks 18 and 19 by means of swinging action of the support 20 about the center axis Q and rotated. According to the tilt angles of the power roller 21 with respect to the toroidal surfaces 18a and 19a of the input and output disks 18 and 19, the transmitted torque ratio (namely the gear ratio) between the input and output disks 18 and 19 is changed. Specifically, the gear ratio of the toroidal transmission unit 17 is determined on the basis of ratio between a radial distance of the contact point between the power roller 21 and the input disk 18 from the transmission input shaft 13 and a radial distance of the contact point between the power roller 21 and the output disk 19 from the transmission input shaft 13.

The planetary gear set 28 is comprised of a sun gear 29 mounted for rotation on the transmission output shaft 14, a plurality of pinions 30 in external mesh with the sun gear 29, a pinion carrier 31 bearing the pinions 30 for rotation, and an external ring gear 32 fastened to the transmission output shaft 14 and kept in mesh with the pinions 30. The sun gear 29 is fixedly connected to the second driven gear 33.

The intermediate shaft 36 fixedly mounts an idle gear 37 in mesh with the first drive gear 15 and first driven gear 26 which is driven by the first drive gear 15 and drives the first driven gear 26. The low clutch 27 is disposed between the first driven gear 26 and the pinion carrier 31 of the planetary gear set 28 to connect and disconnect the torque transmission between them. The high clutch 34 is disposed between the transmission output shaft 14 and the second driven gear, and hence the sun gear 29 of the planetary gear set 28, to connect and disconnect the torque transmission between them. Locking and unlocking these clutches 27 and 28 in specified states shifts the automatic transmission 12 into a reverse gear, low forward gears and high forward gears. The gear ratio of the automatic transmission 12 is changed through both toroidal transmission unit 17 and planetary gear set 28 in the reverse gear and low forward gears, and through only the toroidal transmission unit 17 in the high forward gears.

Figure 2:
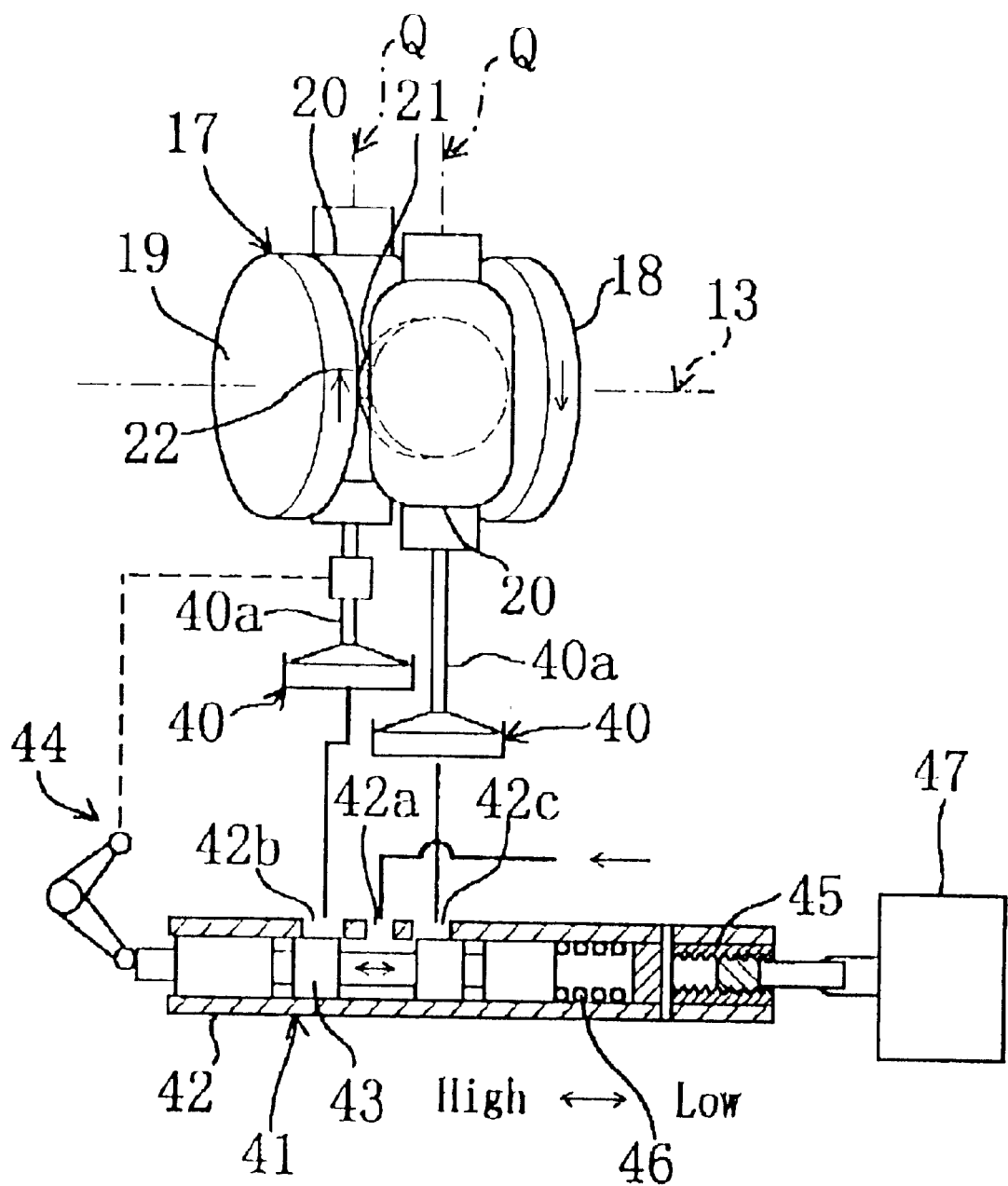
FIG. 2 is a gear shift mechanism of the toroidal type continuously variable automatic transmission of FIG. 1.

FIG. 2 shows the mechanism of gear shift control through the toroidal transmission unit 27 in detail. As shown in FIG. 2, the supports 20 are connected to hydraulic cylinders 40 through piston rods 40a, one of which is for the high forward gears and another of which is for the low forward gears, respectively and turned about the center axis of the transmission input shaft 13 in opposite directions by the hydraulic cylinders 40, tilting around the center axes Q, respectively. The hydraulic cylinders 40 are selectively supplied with hydraulic line pressure through a gear ratio control valve 41 such as an electromagnetic switch valve. This control valve 41 comprises a valve body 42 formed in the shape of cylindrical sleeve which is axially movable in a valve casing (not shown) and a spring loaded spool 43 received and capable of sliding in the valve body 42. The valve body 42 is formed with an inlet port 42a and outlet ports 42b and 42c positioned on axially opposite sides of the inlet port 42a. Hydraulic line pressure is supplied to the control valve 41 through the inlet port 42a and discharged from the control valve 41 to the hydraulic cylinders 40 through the outlet port 42b or 42c. The outlet port 42b is brought into communication with the hydraulic cylinder 40 for the high forward gears. On the other hand, the outlet port 42c is brought into communication with the hydraulic cylinder 40 for the low forward gears. A compression coil spring 46 is disposed between the spool 43 and an abutment sleeve 45 received for slide movement in the valve body 42. This abutment sleeve 45 is linked to a stepping motor 47 and axially moved in the valve body 42 by the stepping motor 47 to force the spool 43 through the coil spring 46. The axial movement of the spool 43 depends on the number of drive pulses given to the stepping motor 47. The spool 43 inversely changes open areas of the outlet ports 42a and 42c. That is, the more the outlet port 42b is opened, the more the outlet port 42c is closed. Consequently, the quantities of pressurized fluid to the hydraulic cylinders are inversely changed. For example, when the spool 43 is moved to the right as viewed in FIG. 2 to increase the open area of the outlet port 42c for the low forward gears and decrease the open area of the outlet port 42b for the high forward gears, increasing the quantity of pressurized fluid to the hydraulic cylinder 40 for low forward gears. As a result, the radial distance of contact point between the input disk 18 and the power roller 21 from the center axis of the transmission input shaft 13 becomes shorter than the radial distance of contact point between the output disk 19 and the power roller 21 from the center axis of the transmission input shaft 13, which makes the gear ratio of the toroidal transmission unit 17 higher. On the other hand, when the spool 43 is moved to the left as viewed in FIG. 2 to increase the open area of the outlet port 42b for the high forward gears and decrease the open area of the outlet port 42c for the low forward gears, increasing the quantity of pressurized fluid to the hydraulic cylinder 40 for high forward gears. As a result, the radial distance of contact point between the output disk 19 and the power roller 21 from the center axis of the transmission input shaft 13 becomes shorter than the radial distance of contact point between the input disk 18 and the power roller 21 from the center axis of the transmission input shaft 13, which makes the gear ratio of the toroidal transmission unit 17 lower. The toroidal transmission unit 17 is provided with a mechanical feedback mechanism 44 between the spool 43 of the gear ratio control valve 41 and the piston rod 40a of the hydraulic cylinder 40 for the high forward gears.

Figure 3:
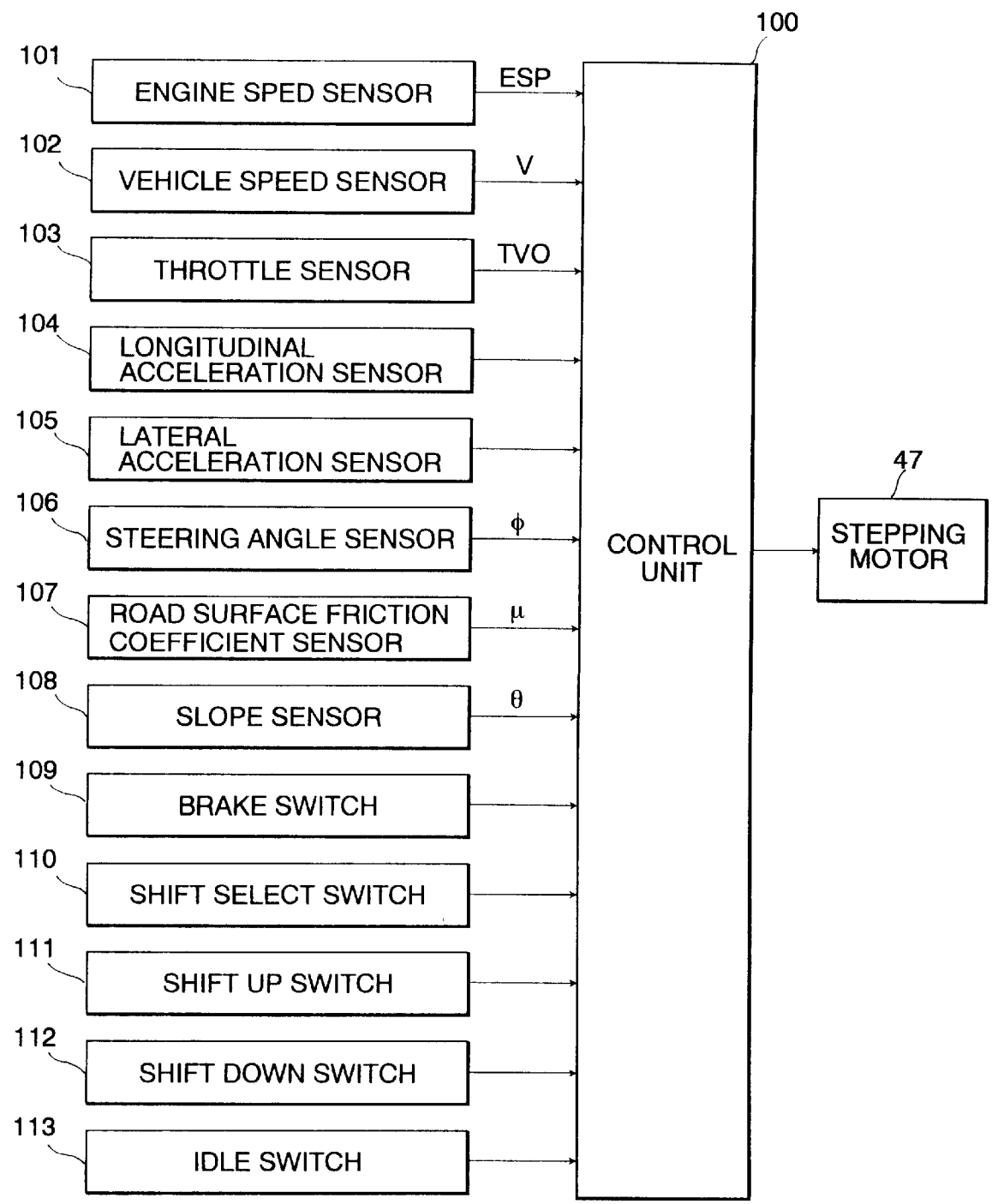
FIG. 3 is a block diagram of the transmission control system for use with the automatic transmission of FIG. 1.

FIG. 3 is a block diagram showing a gear ratio control system which controls the stepping motor 47 to control the gear ratio of the toroidal transmission unit 17. As shown in FIG. 3, the stepping motor 17, as well as other control actuators (not shown) necessary for the automatic transmission control, is controlled with pulse signals from a control unit 100. Specifically, the control unit 100 receives various control signals including an engine speed signal, a vehicle speed signal (V), an engine throttle position signal (TVO), a longitudinal acceleration signal, a lateral acceleration signal, a steer angle, road surface friction coefficient, a road surface grade, a brake signal, a manual shift mode select signal, a manual shift up command signal, and an on-idle signal. These signals are provided by sensors and switches. In more detail, speed sensors 101 and 102 detect the speeds of rotation of the transmission input shaft 13 and the transmission output shaft 14 substitutive for the engine speed and the vehicle speed, respectively. A position sensor 103 detects the opening of engine throttle valve. Acceleration sensors 104 and 105 detect the longitudinal acceleration and lateral acceleration, respectively. An angle sensor 106 detects the steer angle of a steering wheel 50 (see FIG. 4). A friction sensor 28 detects the frictional coefficient of a road surface. A slope sensor 108 detects the road surface grade. A torque sensor 109 detects torque at the output shaft 1a of the engine 1. A brake switch 110 is activated to provide the brake signal when a brake pedal (not shown) is stepped on. A manual shift mode select switch 111 is operated to select the manual gear shift mode and generates a manual shift mode select signal. A shift up switch 112 is operated to provide a shift up command signal. Similarly, a shift down switch 113 is operated to provide a shift down command signal. An idle switch 113 is activated when the engine throttle valve is in the idle position, i.e. the idle position. All of these sensors and switches 101 through 114 are known in various types, and may take any well known type. As will be described in detail later, the control unit 100 drives the stepping motor 47 with drive pulse signals provided based on an automatic gear shift map (see FIG. 6) which specifies a target engine speed (ESPO) with respect to the vehicle speed (V) and the engine throttle opening (TVO) to change the gear ratio of the toroidal transmission unit 17 so as to bring the engine speed into agreement with the target engine speed (ESPO).

Figure 7:
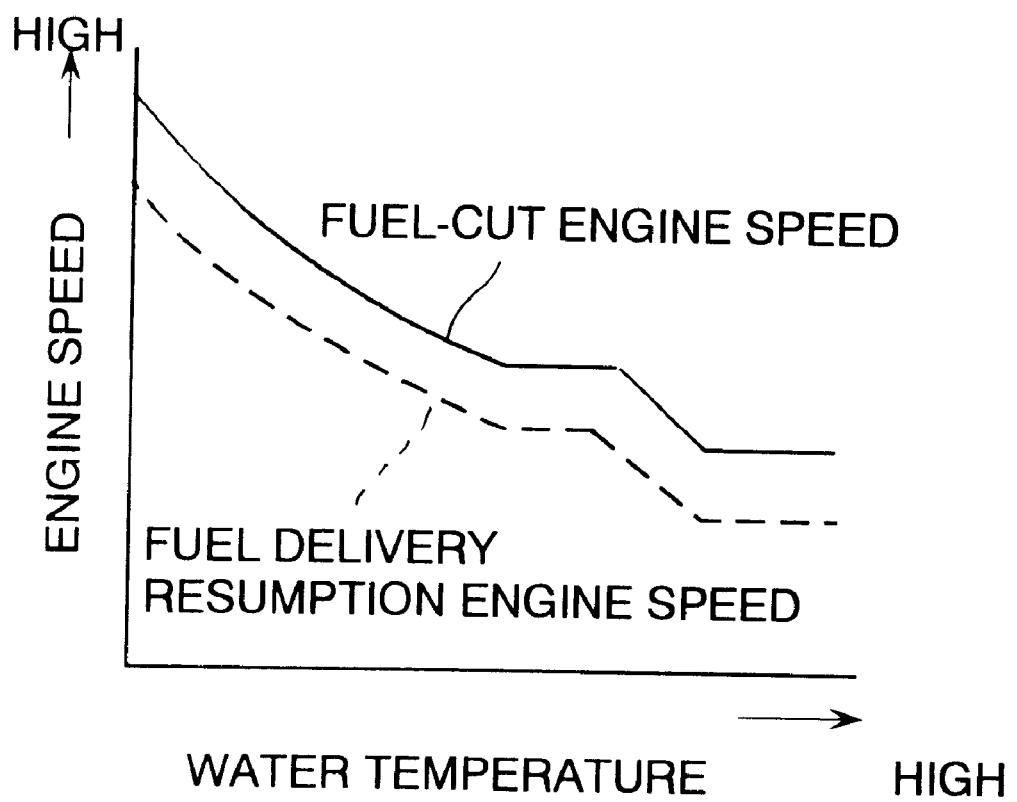
FIG. 7 is a characteristic diagram illustrating a fuel cut zone.

The control unit 100 has a fuel cut means 118 to make the fuel injection valve 9 interrupt fuel delivery to the engine 1 while the engine operating condition is in a specific fuel cut zone. The fuel cut is performed when the engine 1 is operating at speeds in the fuel cut zone specified between a fuel cut line and fuel resume line as shown in FIG. 7 with the idle switch 114 remaining activated.

Figure 4:
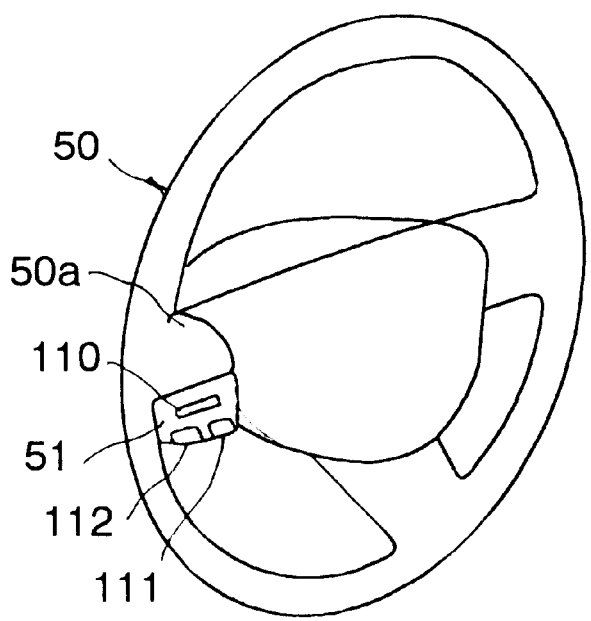
FIG. 4 is a schematic perspective view of a steering wheel.
Figure 5:
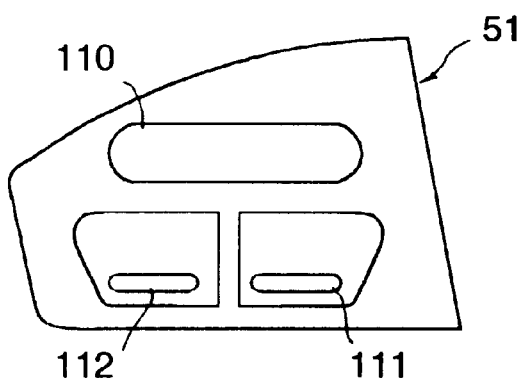
FIG. 5 is an enlarged plan view of a manual shift operation panel of the steering wheel.

FIGS. 4 and 5 show the steering wheel 50 provided with switches 111 through 113 in relation to manual gear shifts. The steering wheel 50 of a right driving vehicle has a switch board 51, secured to a spoke 50a at the right as viewed when the vehicle is traveling straight ahead, on which the manual shift mode select switch 111, the shift up switch 112 and the shift down switch 113 are arranged. Specifically, the manual shift mode select switch 111 is located above the shift up switch 112 and the shift down switch 113 laid side by side. The shift up switch 112 is preferably disposed on an inner side of the shift down switch 113 in the radial direction. The manual shift mode select switch 111, which may be of a push-on push-off type, is pushed to select the manual gear shift mode and pushed again to resume the automatic gear shift mode.

Figure 6:
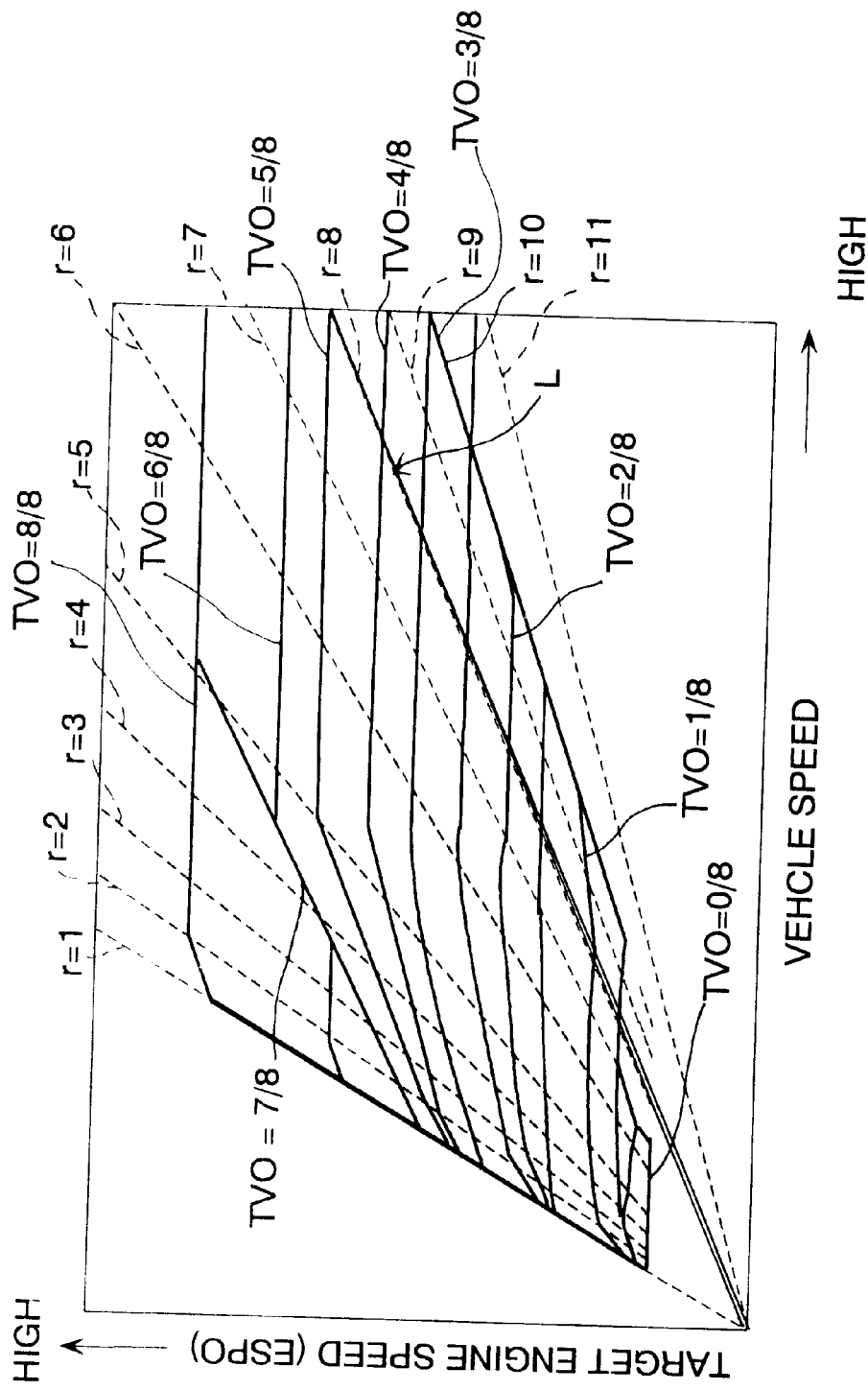
FIG. 6 is a diagrammatic illustration showing an automatic gear shift control map.
Figure 8:
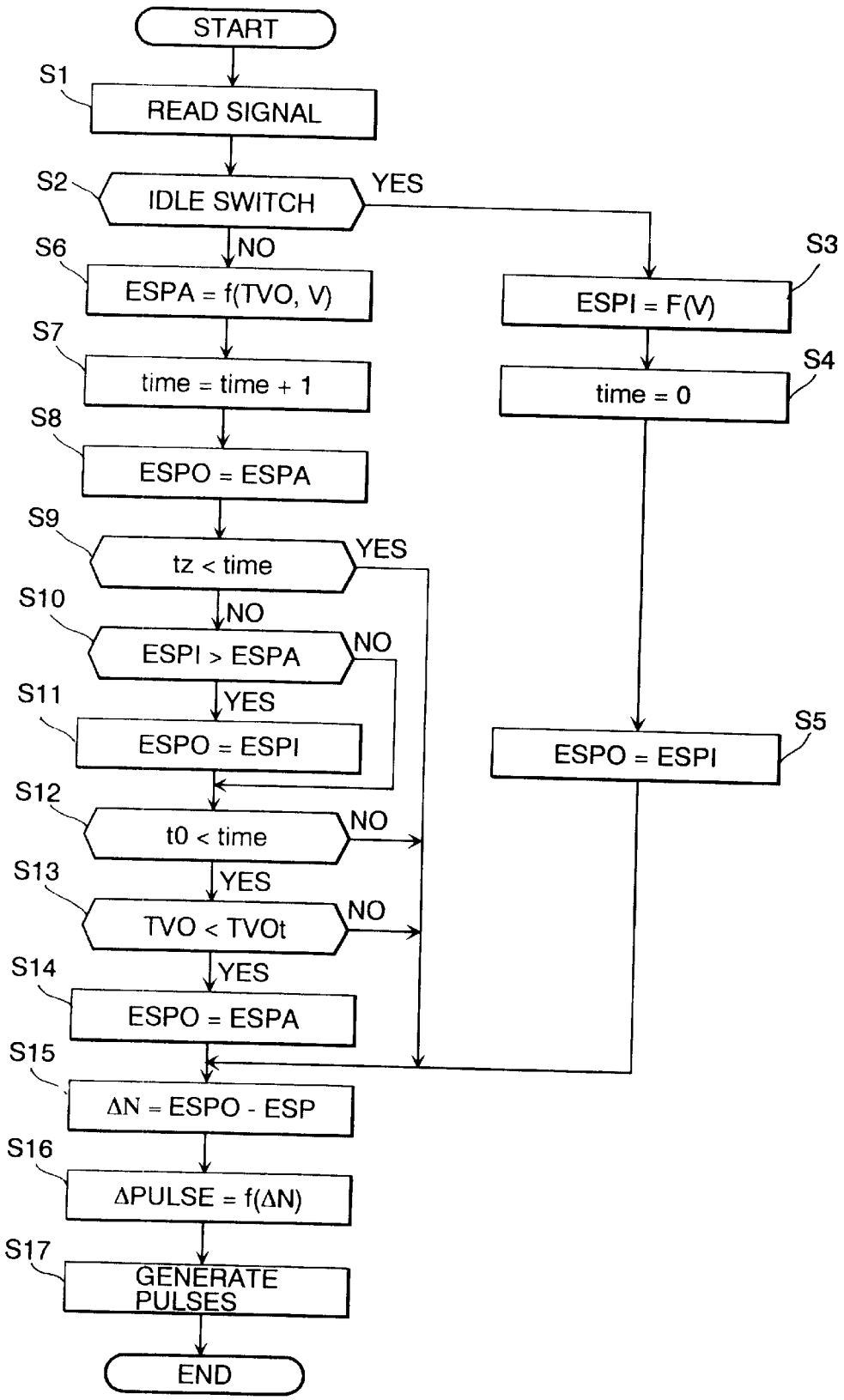
FIG. 8 is a flowchart illustrating the gear ratio control sequence routine.

FIG. 8 shows a flowchart illustrating the manual gear shift control sequence routine in which the stepping motor 47 is controlled to drive the gear ratio control valve 41. The flowchart logic commences and control passes directly to a function block at step S1 where the control unit 100 reads in various signals from the sensors and switches 101 through 114. Subsequently, at step S2, a determination is made as to whether or not the idle switch 114 is activated. When the idle switch is activated, an on-idling target engine speed ESPI for the vehicle speed V is read on a brake control line L in the automatic gear shift map with respect to shown in FIG. 6 at step S3. As shown by solid line in FIG. 6, the automatic gear shift map has scheduled gear shift lines, each of which specifies a target engine speed ESPO with respect to vehicle speed V and engine throttle opening TVO. Each brake control line L is established so as to increase engine speed ESPO appropriately with an appropriate effect of engine braking during deceleration. In FIG. 6, chained lines indicate eleven steps of gear ratios into which the overall gear ratio of the automatic transmission is divided and which are selected by operation of the shift up switch 111 or the shift down switch 112 in the manual shift mode.

Subsequent to step S3, after resetting the timer count time to zero at step S4, the target engine speed ESPO is changed to the on-idling target engine speed ESPI at step S5.

On the other hand, when the idle switch is off, a target engine speed ESPO according to throttle opening TVO and vehicle speed V which is read from the automatic gear shift map at step S6 is set as an off-idling target engine speed. Subsequently, after changing the timer count time by an increment of one at step S7, the target engine speed ENPO is changed to the off-idling target engine speed EPA at step S8. At step S9, a determination is mad as to whether or not the timer has counted up a first specified time tz. When the first critical time tz has not yet passed, another decision is made at step S9 as to whether or not the on-idling target engine speed ESPI is higher than the off-idling target engine speed EPA. When the on-idling target engine speed ESPI is higher than the off-idling target engine speed EPA, the on-idling target engine speed ESPI is set as the off-idling target engine speed EPA at step S11. Thereafter, or when the on-idiling target engine speed ESPI is equal to or less than the off-idling target engine speed EPA, a determination is made at step S12 as to whether the timer has counted a second critical time t0 which is smaller than the first critical time tz. When the timer count time is greater than the second critical time t0, a determination is made at step S13 as to whether or not the throttle opening TVO is greater than a threshold opening TVOt which is predetermined according to vehicle speed V for acceleration judgement. When the throttle opening TVO has become over the threshold opening TVOt, this is regarded that the vehicle is not accelerated, then, the target engine speed ESPO is changed to the off-idling target engine speed EPA at step S14. When the throttle opening TVO is equal to or greater than the threshold opening TVOt, it is regarded that the vehicle is accelerating. After setting the target engine speed ESPO at step S14, or when the throttle opening TVO is smaller than the threshold opening TVOt, or when the timer has not yet counted up the first critical time tz nor the second critical time t0, the speed difference ΔN between the actual engine speed ESP and the target engine speed ESPO is calculated at step S15. Based on the speed difference ΔN, the number of pulses ΔPULSE is calculated at step S16 and generated by feedback control at step S17. The pulses are sent to the pulse motor 47.

As described above, the gear ratio of the automatic transmission is controlled by feedforward control so as to bring the engine speed toward a target engine speed specific to engine speed V to throttle opening TVO. When the throttle opening reaches its idle position during idling, the target engine speed EPA is increased to an on-idling target engine speed ESPI specified by the brake control line L to increase the gear ratio of the automatic transmission 12. The target engine speed ESPO is set to a target engine speed EPA corresponding to throttle opening TVO and vehicle speed V when the throttle opens, that is, when the idle switch 114 is turned off. On the other hand, the target engine speed ESPO is set to an on-idling target engine speed EPA when the throttle is closed, that is, when the idle switch 114 is turned on. When the idle switch turns off after the idle switch 114 has once turned on resulting from closing the engine throttle, the off-idling target engine speed EPA according to vehicle speed V and throttle opening at that point of time is compared to an on-idling target engine speed ESPI, and the on-idling target engine speed ESPI is taken as the target engine speed ESPO until the off-idling target engine speed EPA becomes higher than the on-idling target engine speed ESPI. When the throttle opens but less than the threshold opening after an elapse of the second critical time t0 from a point of time at which the idle switch 114 is turned off, the target engine speed ESPO is coercively set to the off-idling target engine speed EPA, and hence the target engine speed ESPO is prevented from being set to the on-idling target engine speed ESPI.

With the transmission control system, when the manual shift mode is canceled by operating the manual shift select switch 111 during traveling, the target engine speed EPA is determined based on vehicle speed V and throttle opening TVO and the number of pulses for driving the stepping motor 47 is determined so as to bring the engine speed to the target engine speed EPA. In this manner, the gear ratio of the automatic transmission 12 is feedback controlled. When the idle switch 114 turns on resulting from closing of the engine throttle, the target engine speed ESPO is set to an on-idiling target engine speed ESPI specified by a brake control line L to raise engine speed ESP. As a result, the gear ratio varies on the brake control line L to the Low side to increase. Therefore, even the fuel cut zone is provided in order to cut fuel delivery to the engine 1 when, while the engine throttle is in the idle position, the engine 1 operates at a speed ESP higher than a specific speed as shown in FIG. 7, a time for which engine operating conditions stay in the fuel cut zone is prolonged when the increased target engine speed declines after having once raised. This results in effective use of the fuel cut zone with an effect of improving fuel efficiency even when the engine speed is decreased to bring the automatic transmission toward High ratio.

Figure 9:
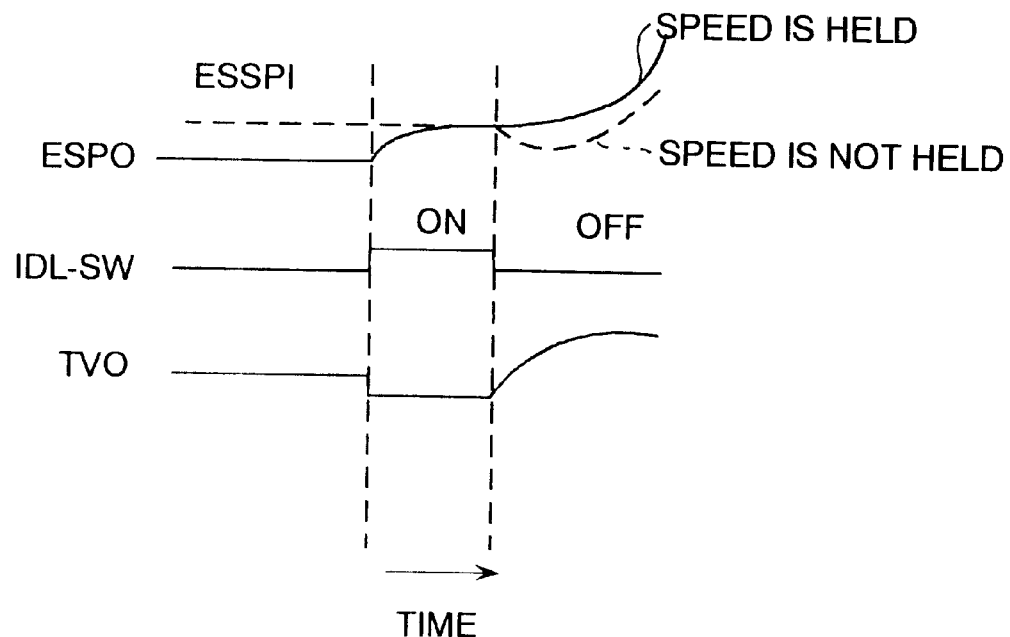
FIG. 9 is a time chart showing a change in engine speed during acceleration.

As shown in FIG. 9, when the engine throttle opens with turning off the idle switch 114, which is regarded as acceleration, an on-idling target engine speed ESPI at that point of time is compared with an off-idling target engine speed EPA determined based on vehicle speed V and throttle opening TVO. If the target engine speed EPA is lower for off-idling than for on-idling, the on-idling target engine speed ESPI is taken as the target engine speed ESPO until the off-idling target engine speed EPA raises beyond the on-idling target engine speed ESPI. In this manner, the engine is prevented from encountering a fall of speed regardless an acceleration demand likely in cases where the off-idling target engine speed EPA depending on vehicle speed V and throttle opening TVO is taken as the target engine speed ESPO still during acceleration. This improve a feeling of smooth acceleration.

Figure 10:
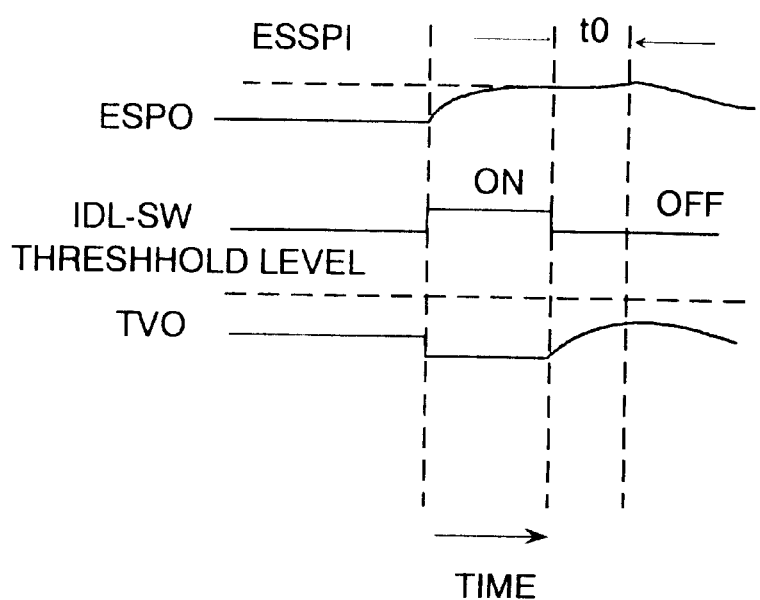
FIG. 10 is a time chart showing a change in engine speed during non-acceleration.

The on-idling target engine speed ESPI is continuously employed as the target engine speed ESPO before passage of the second critical time t0 from a point of time at which the engine throttle opens with turning off the idle switch 114, or while the engine throttle opens to an opening TVO less than the threshold opening TVOt. However, as shown in FIG. 10, when the engine throttle opening is less than the threshold opening TVOt at the passage of the second critical time t0 from the point of time at which the idle switch turns off, this is regarded as not acceleration, then, the on-idling target engine speed ESPI is not employed as the target engine speed ESPO. In this way, during non-acceleration, the off-idle target engine speed EPA, which depends upon vehicle speed V and throttle opening TVO, is continuously employed as the target engine speed ESPO, the engine speed is lowered smoothly with an effect of improving the drive feeling during ordinary traveling.

At passage of the first critical time tz from when the idle switch 114 turns off, the employment of on-idling target engine speed ESPI and a deceleration judgement based on the comparison of throttle opening TVO with the threshold opening are interrupted. Consequently, in cases where the vehicle travels on a long gentle down slope with the engine throttle opened to a level rather slightly greater than when traveling on a flat road (in which the engine throttle opens greater than the threshold opening TVOt), it is prevented that the on-idling target engine speed ESPI is continuously used as the target engine speed ESPO resulting from a judgement acceleration. This prevents aggravation of fuel efficiency.

Figure 11:
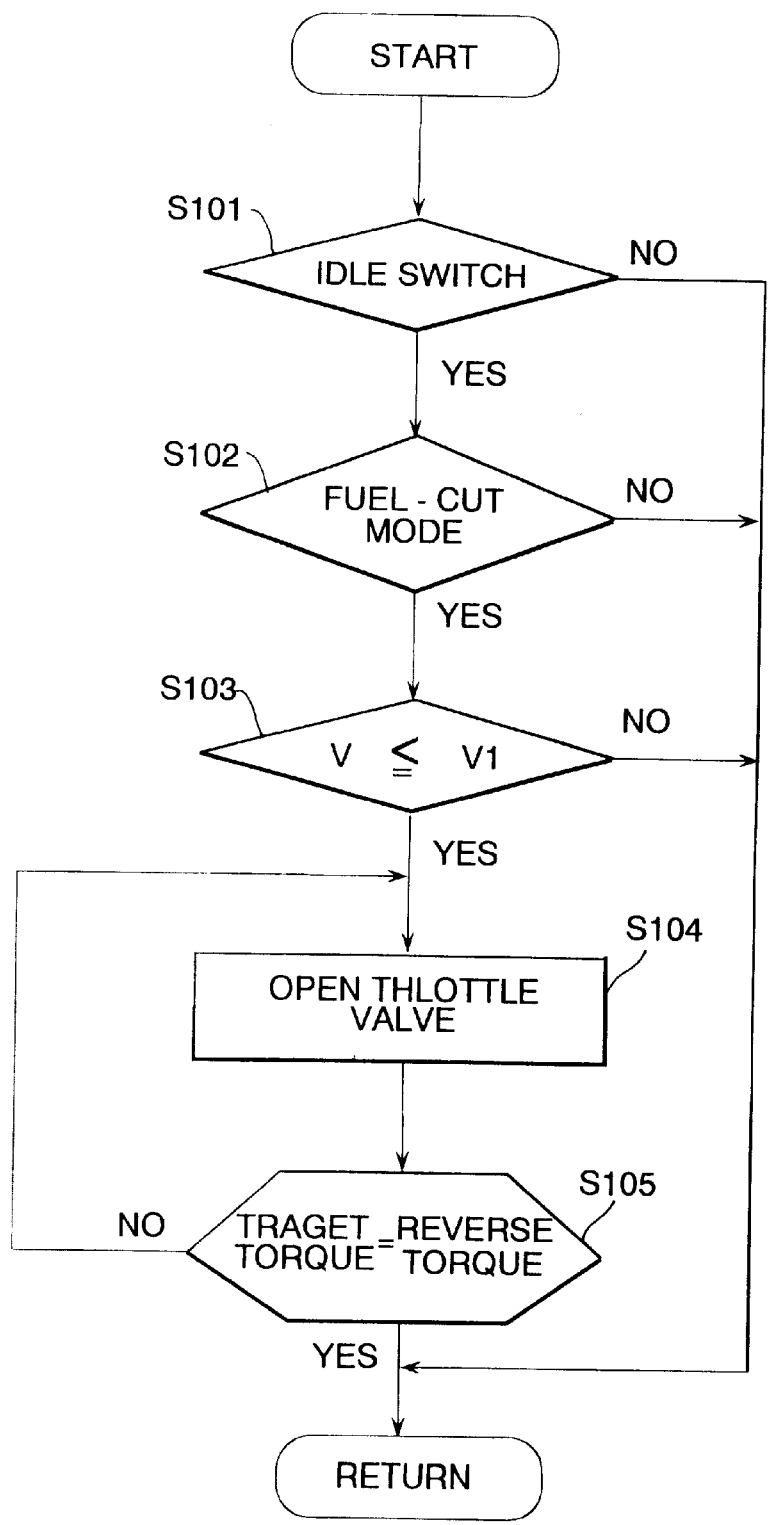
FIG. 11 is a flowchart illustrating another gear ratio control sequence routine.
Figure 12:
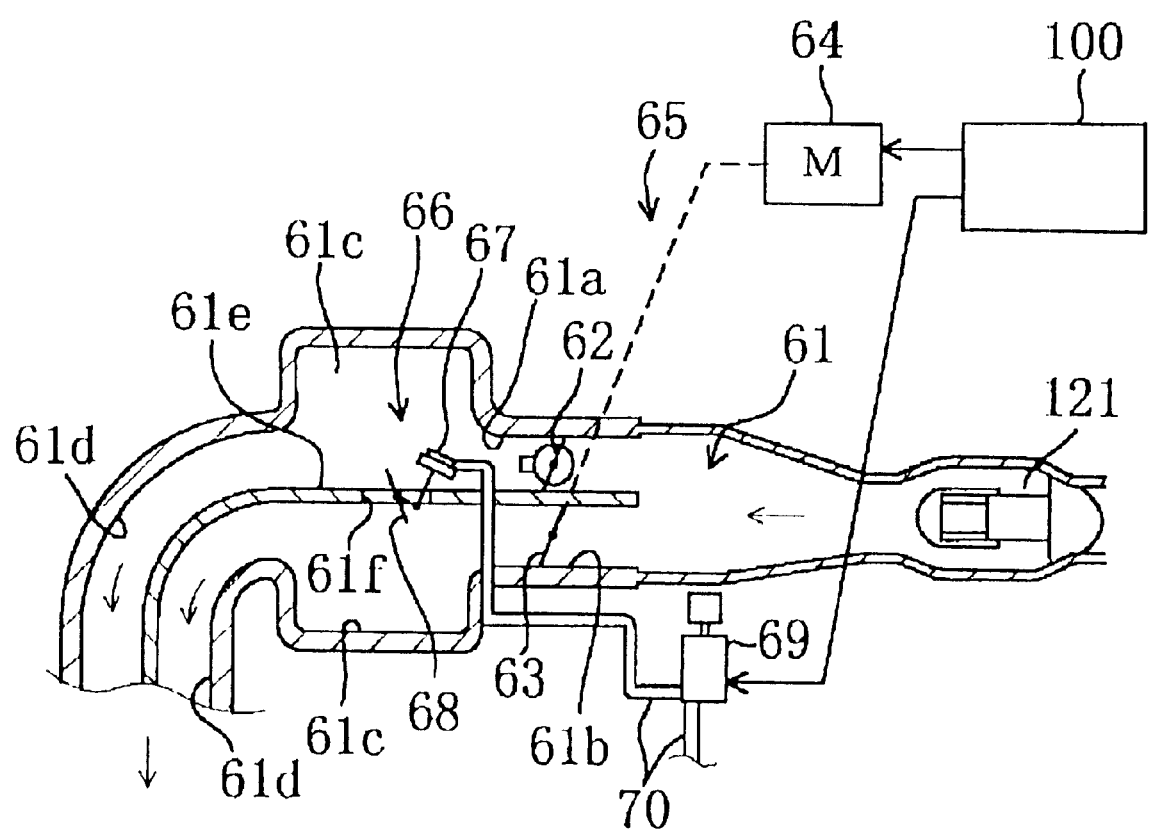
FIG. 12 is a cross-sectional view of an essential part of pumping loss varying mechanism.
Figure 13:
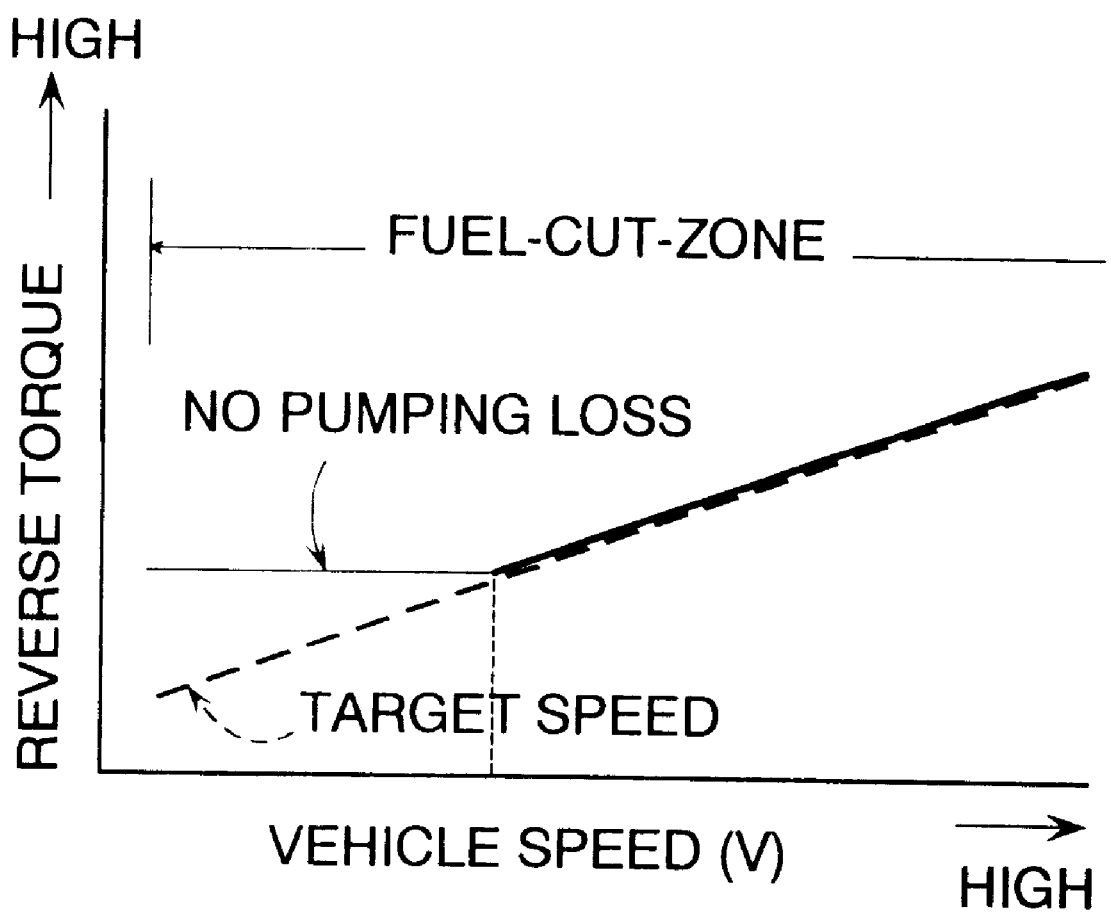
FIG. 13 is a characteristic diagram showing a target reverse torque applied to the engine from the drive wheels.

FIGS. 11 through 13 show a mechanism for varying the pumping loss of engine while the engine throttle is in its idle position to prevent the engine from applying braking effective in excess. As shown in FIG. 13, an engine intake system 61 at its middle position is divided into two passages 61a and 61b, one of which is provided with a mechanical throttle valve 62 linked with an accelerator pedal (not shown) and another of which is provided with electrically actuated throttle valve 63 including a motor 64, as a pumping loss varying mechanism 65, controlled in operation by a control unit 100. A flowing rate of air introduced into the engine 1 is measured by an air flow sensor 121. The engine 1 is equipped with a variable air intake mechanism 66 for changing an inertial supercharging effect according to engine speed. A plurality of engine cylinders are divided into two groups. Each group of cylinders are directly connected to independent intake passages 61d which join together at a common intake passage 61c in which the mechanical and electric throttle valves 62 and 63 are installed. These common passages 61c for the two cylinder groups are laid side by side and, however, separated by a partition wall 61e. The partition wall 61e is formed with an opening 61f for communication between the common passages 61c. A variable intake valve 68 in the form of a shutter valve is disposed within the opening 61f and actuated by a negative pressure actuator 67 to variably open and close the opening 61f. Negative pressure is introduced into the pressure chamber of this actuator 67 through an air passage 70 provided with a solenoid valve 69. The control unit 100 controls the solenoid valve 69 to regulate the pressure level of negative pressure passing therethrough so as to variably open and close the variable intake valve 68 according to engine speeds. In this manner, the variable intake valve 68 connects and disconnects communication between the common passages 61c. The variable intake valve 68 is closed with providing an inertial supercharging effect for the respective cylinders, and is opened to eliminate the inertial supercharging effect for the respective cylinders.

Opening and closing control of the variable intake valve 68 is performed following the sequential routine shown in FIG. 11. When the flowchart logic commences and control proceeds directly to a determination at step S101 as to whether the idle switch 114 is on. When the idle switch 114 is off, the sequential control immediately terminates. When the idle switch 114 is on, determinations are subsequently made at steps S102 and 103 as to whether the engine 1 is in the fuel-cut mode and whether the vehicle speed V is smaller than a threshold speed V1, respectively. When each answer is negative, the sequential control immediately terminates.

On the other hand, each answer is affirmative, then, the electric throttle valve 63 is opened at step S104. At step S105, a determination is made at step S105 as to whether reverse torque, which applied to the engine from drive wheels during deceleration, is equal to target torque. Until the target reverse torque is created, the electric throttle valve 63 is repeatedly opened at step S104. As shown in FIG. 13, the target reverse torque is proportionally decreased with a decrease in vehicle speed V. Owing to operation of the electric throttle valve 63, the engine changes a pumping loss.

With this control system, when the engine throttle takes its idle position with the result of turning on the idle switch 114, the electric throttle valve 63 is opened for vehicle speeds V less than the threshold speed V1 while the engine 1 is in the fuel-cut mode. This causes a decrease in engine pumping loss for a period until the target reverse torque is generated. Consequently, even when the engine applies braking force in excess due to the fuel-cut control when engine operating conditions are left to stay within the fuel cut zone as a result of a raise in the target engine speed ESPO on an event of turning on of the idle switch 114, a decrease in engine pumping loss eliminates an increased effect of engine braking force, keeping appropriate engine braking force.

Various variations may be taken to vary the pumping loss of engine as shown in FIGS. 14 through 27.

Figure 14:
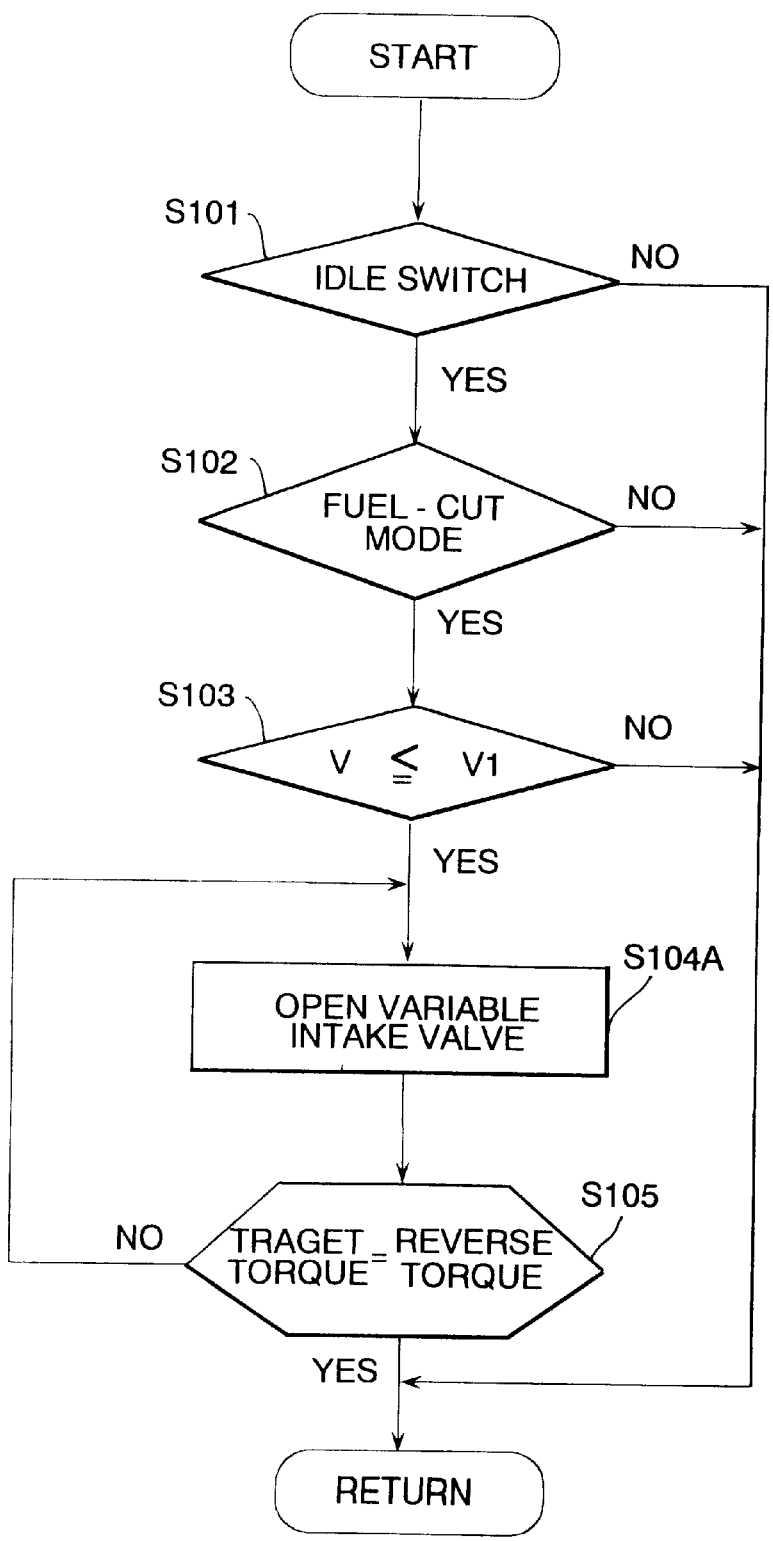
FIG. 14 is a flowchart illustrating another gear ratio control sequence routine.

FIG. 14 shows one of examples of pumping loss varying control in which the variable intake valve 68 is used as a pumping loss varying means. In this example, in place of the electric throttle valve 63, the variable intake valve 68 is controlled to open and close depending upon vehicle speed at step S104A in the pumping loss varying control sequential routine.

Also with this control system, when the engine throttle takes its idle position with the result of turning on the idle switch 114, the variable intake valve 68 is left opened until an target reverse torque is attained for vehicle speeds V less than the threshold speed V1 while the engine 1 is in the fuel-cut mode. This causes a decrease in engine pumping loss while the fuel cut control is performed, and hence even when the engine applies braking force in excess due to the fuel-cut control, an increased effect of engine braking force caused due to fuel-cut is eliminated and appropriate engine braking force is kept.

Figure 15:
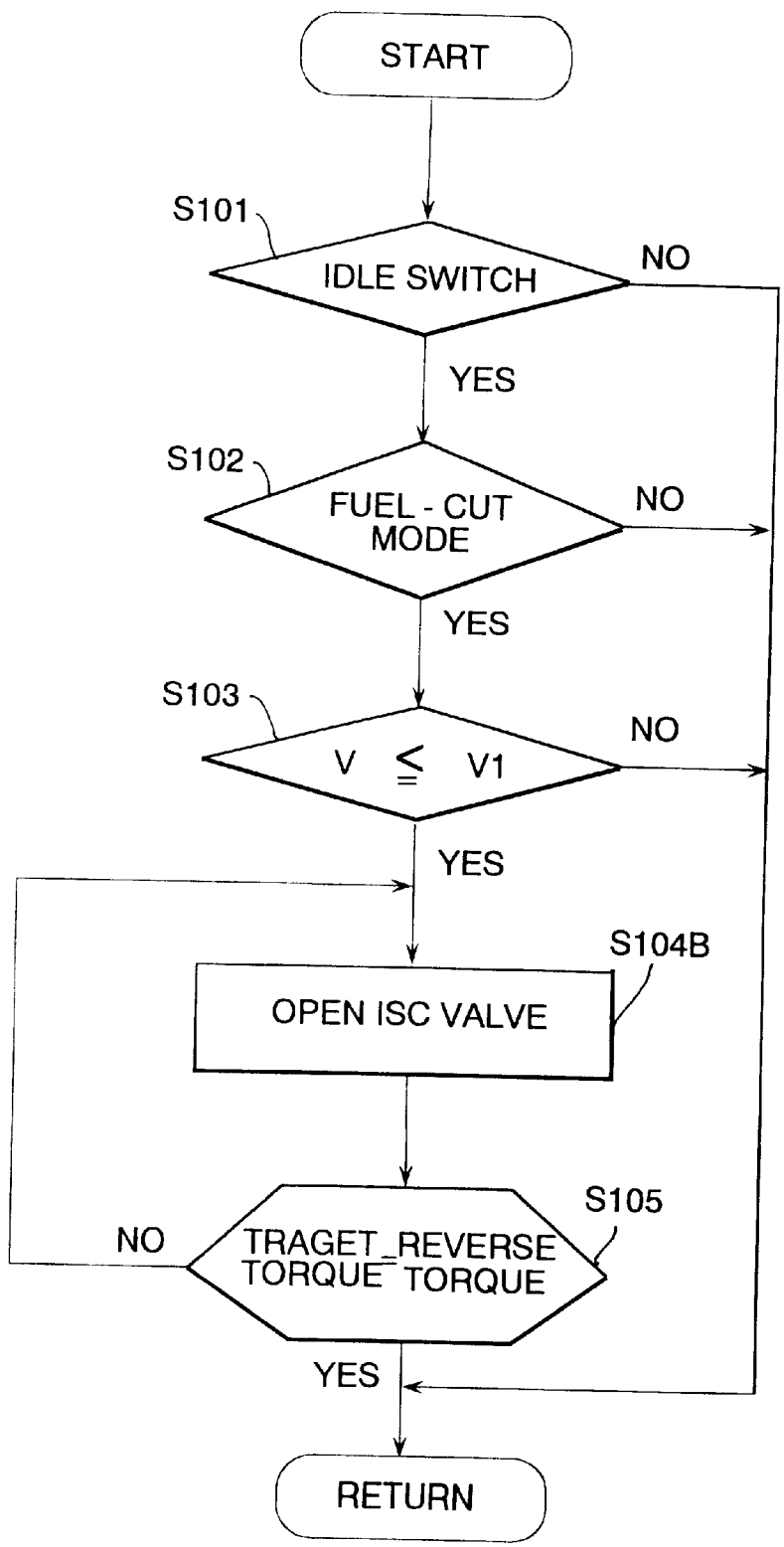
FIG. 15 is a flowchart illustrating another gear ratio control sequence routine.
Figure 16:
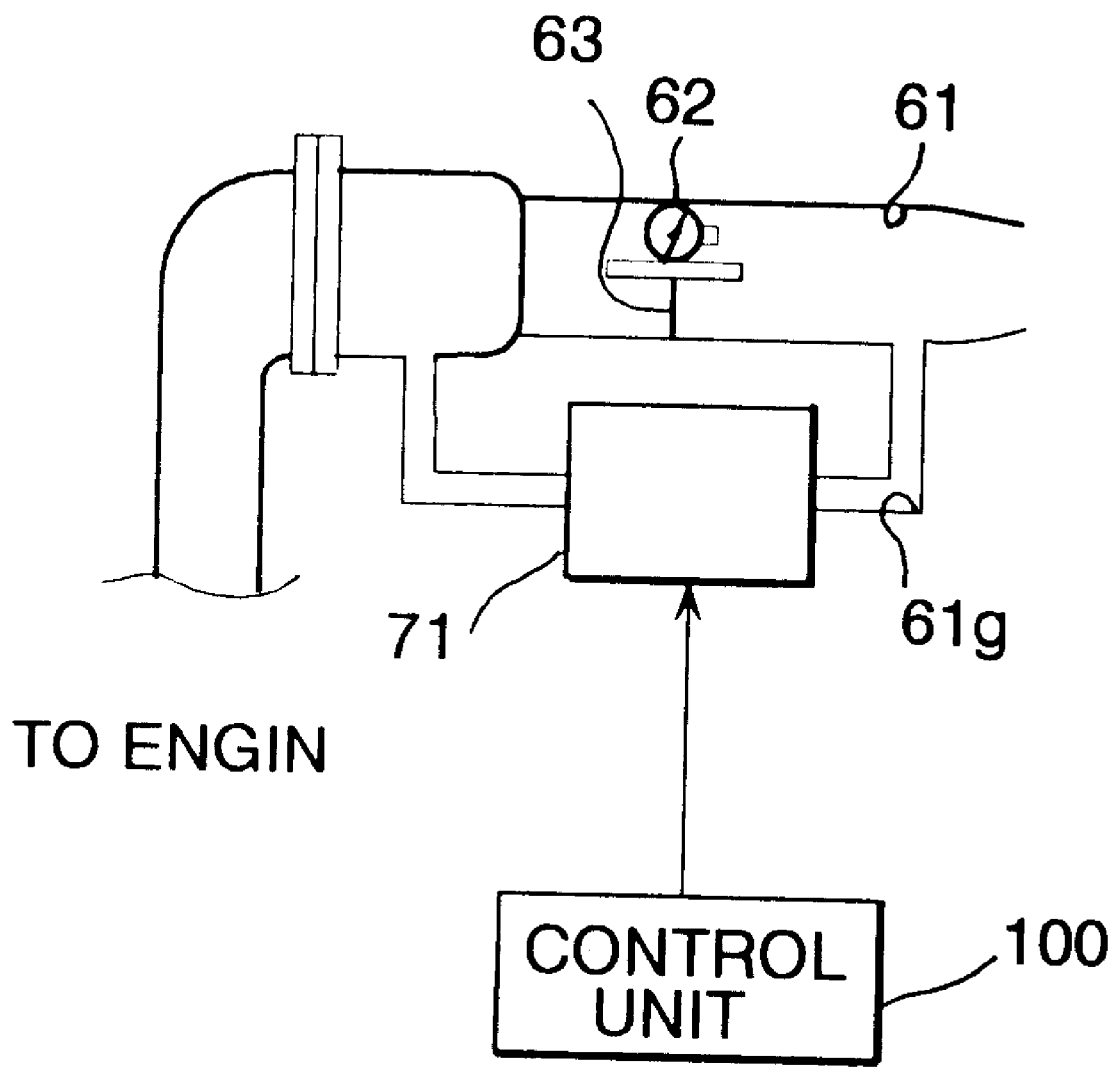
FIG. 16 is a cross-sectional view of essential part of an idle speed control mechanism.

FIG. 15 and 16 shows another example of pumping loss varying control in which, in place of the electric throttle valve 63 or the variable intake valve 68, an idle speed control valve is used as a pumping loss varying means. As shown in FIG. 16 the intake passages 61 upstream from the respective throttle valves 62 and 63 are intercommunicated by a bypass passage 61g provided with an idle speed control valve (ISC valve) 71 therein. The idle speed control valve 71 is controlled to open and close depending upon vehicle speed at step S104B in the pumping, loss varying control sequential routine shown in FIG. 15.

Also with this control system, when the engine throttle takes its idle position with the result of turning on the idle switch 114, the idle speed control valve 71 is left opened until an target reverse torque is attained for vehicle speeds V less than the threshold speed V1 while the engine 1 is in the fuel-cut mode. This causes an increase in the amount of intake air while the fuel cut control is performed, and consequently an increased effect of engine braking force caused due to fuel-cut is eliminated and appropriate engine braking force is kept.

Figure 17:
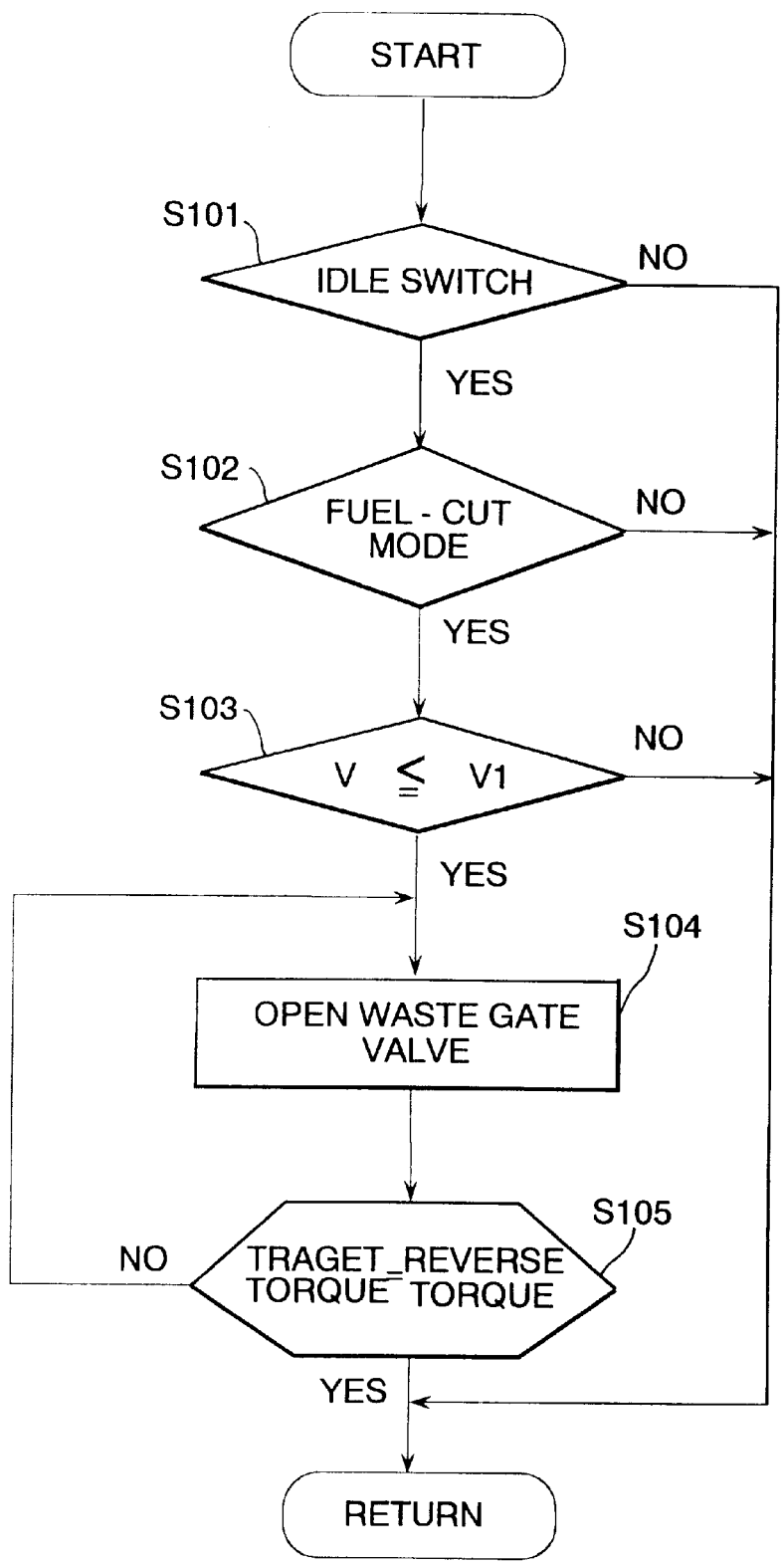
FIG. 17 is a diagrammatic illustration showing an initial gear map.
Figure 18:
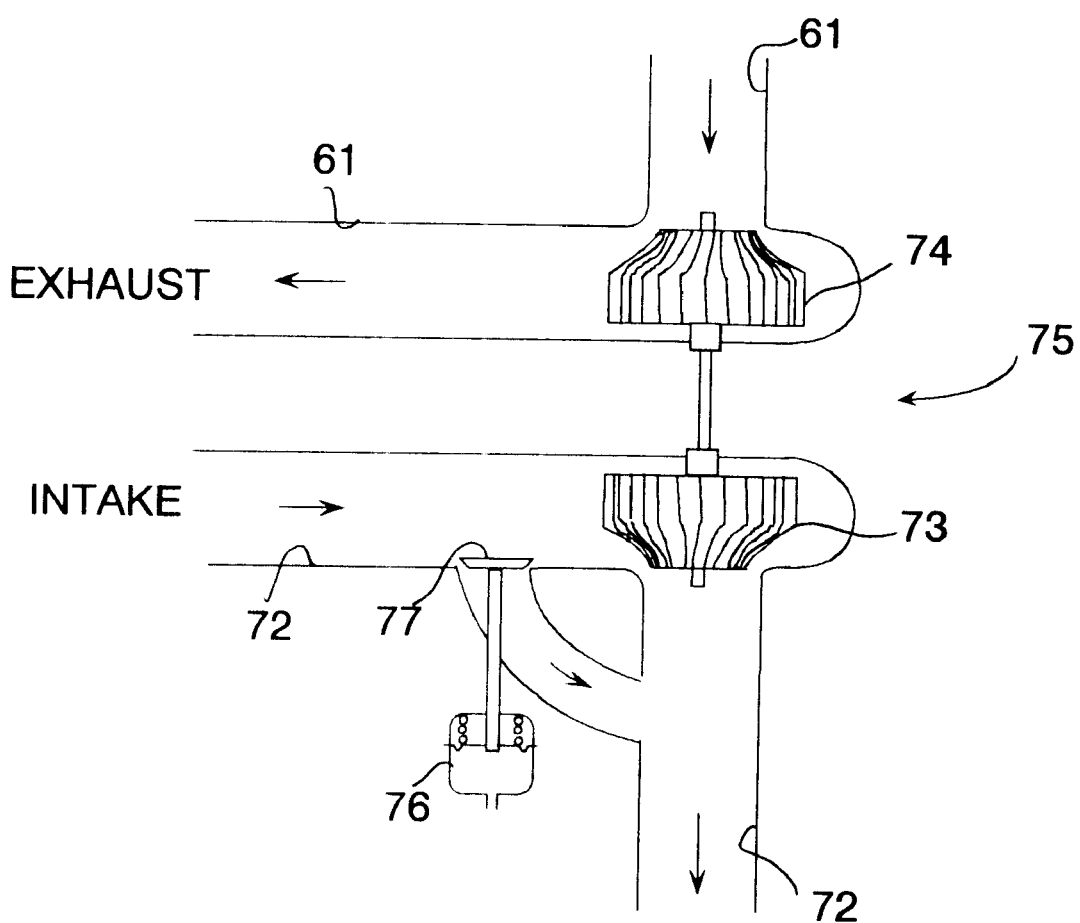
FIG. 18 is a flowchart illustrating another gear ratio control sequence routine.

FIGS. 17 and 18 show another example of pumping loss varying control in which, in place of the electric throttle valve 63, the variable intake valve 68, or the idle speed control valve 71, a turbo super charging mechanism 75 is used as an pumping loss varying means. As shown in FIG. 18 the turbo super charging mechanism 75 comprises a turbine 73 disposed in an exhaust passage 72 and driven or rotated with exhaust gas discharged from the engine 1, and a blower 74 disposed in an intake passage 61 and driven or rotated by the turbine 73 to charge intake air into the engine 1. The passage sections of the exhaust passage 72 upstream and downstream from the turbine 73 are communicated by a bypass passage 72a provided with a waste gate valve 77. This waste gate valve 77 is actuated by a negative valve actuator 76 operated by a solenoid valve (not shown). These waste gate valve 77, negative valve actuator 76 and solenoid valve form a pumping loss varying means. The waste gate valve 77 is controlled to open and close at step S104C in the pumping loss varying control sequential routine shown in FIG. 17.

With this control system, when the engine throttle takes its idle position with the result of turning on the idle switch 114, the waste gate valve 77 is left opened until an target reverse torque is attained for vehicle speeds V less than the threshold speed V1 while the engine 1 is in the fuel-cut mode. This causes an increase in the amount of intake air while the fuel cut control is performed, and consequently an increased effect of engine braking force caused due to fuel-cut is eliminated and appropriate engine braking force is kept.

Figure 19:
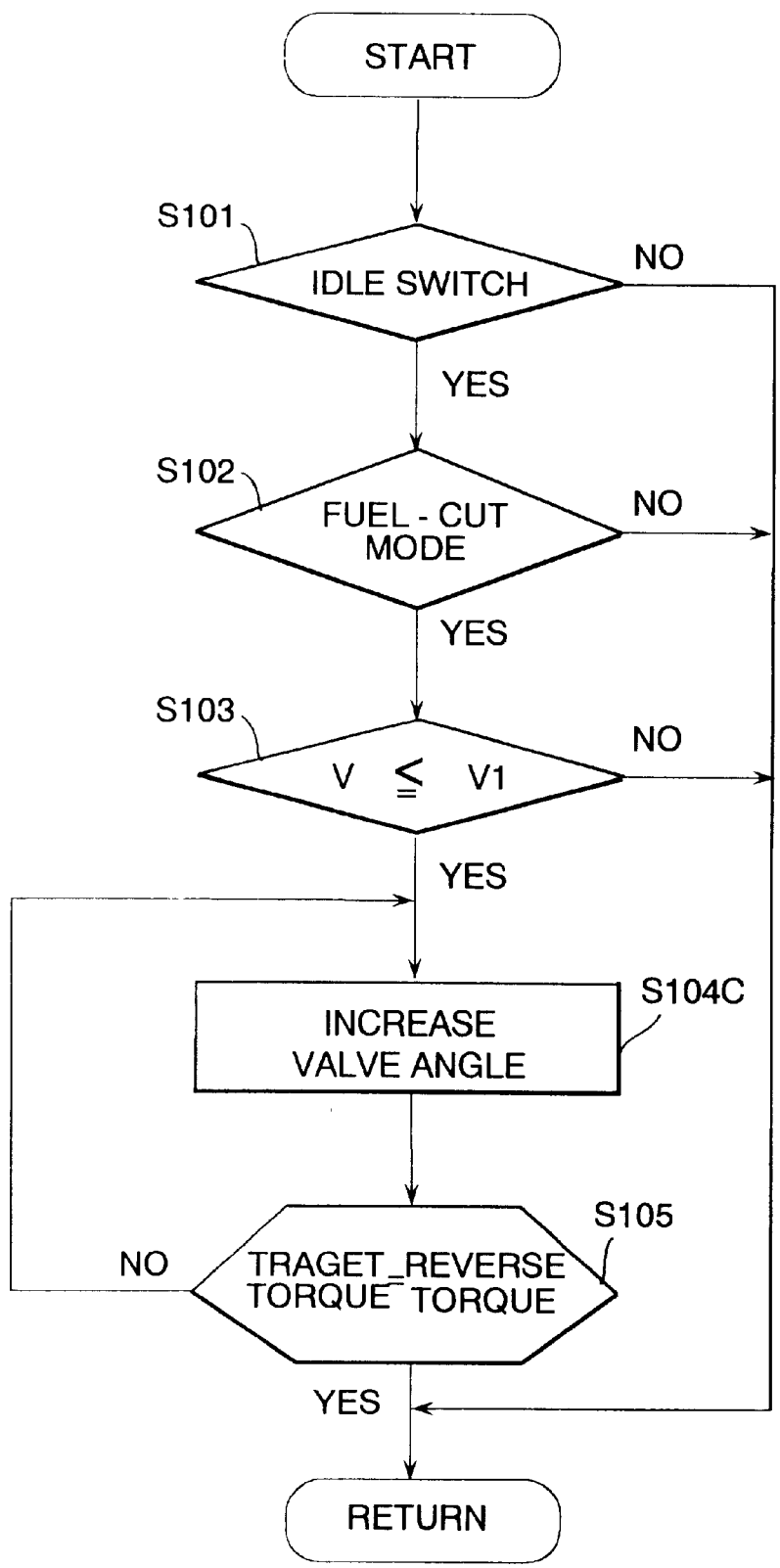
FIG. 19 is a schematic cross-sectional view of a waste gate valve.
Figure 20:
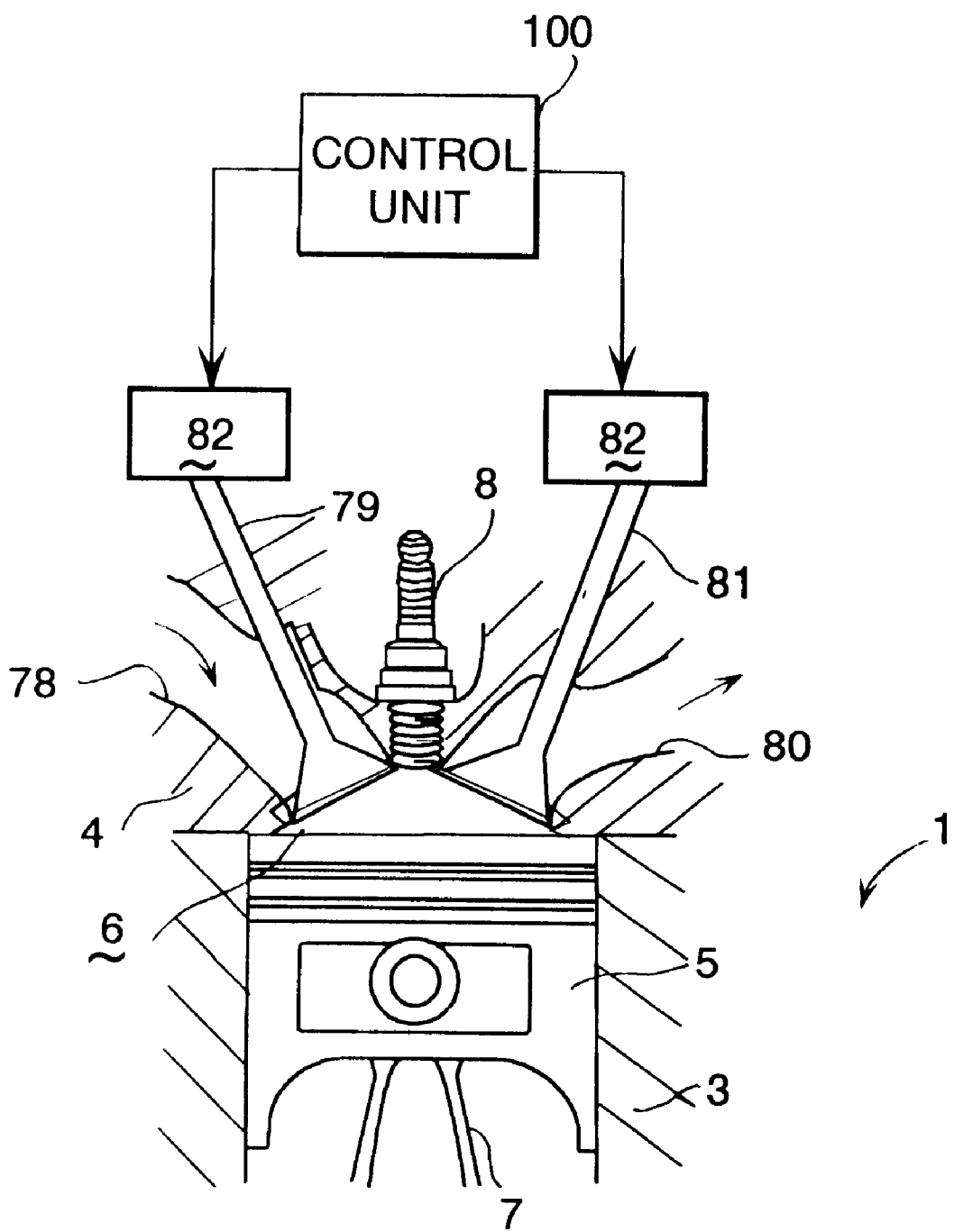
FIG. 20 is a schematic cross-sectional view of a variable valve timing mechanism.
Figure 21:
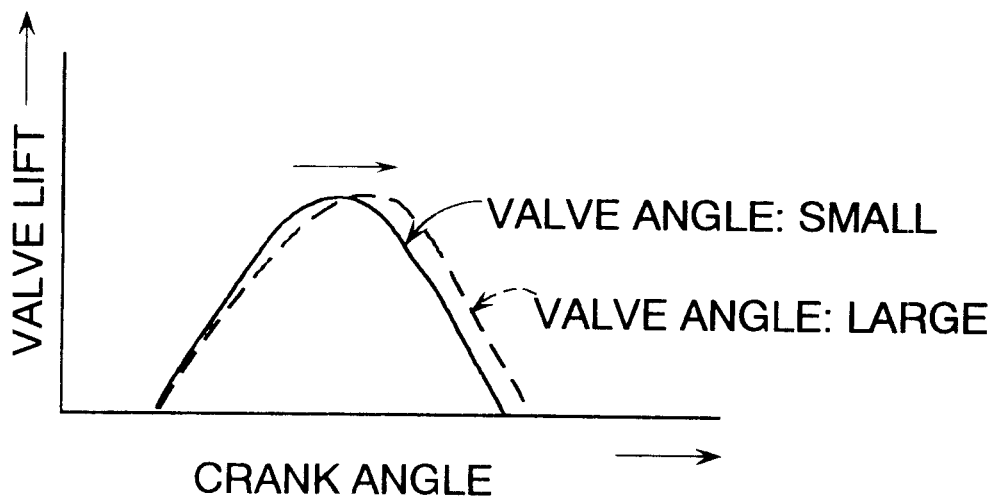
FIG. 21 is a characteristic diagram showing valve timing.

FIGS. 19 through 21 show an example of pumping loss varying control in which variable valve timing mechanisms 82 are used as an pumping loss varying means. As shown in FIG. 20 variable valve timing mechanisms 82 are mechanically related to intake valves 79 for opening and closing intake ports 78 and exhaust valves 81 for opening and closing exhaust ports 80, respectively. The valve timing mechanism 82 is controlled by the control unit 100 to cause an increase in valve opening angle of the intake valve or the exhaust valve. In FIG. 20 numerals 3, 4, 5, 7 and 8 indicate respectively cylinder block, cylinder head formed with intake ports 78 and exhaust ports 80, piston in a combustion chamber 6, connecting rod and ignition plug exposed to the interior of the combustion chamber 6. At step S104D in the pumping loss varying control sequential routine shown in FIG. 19, the valve timing mechanism 82 is controlled to cause an increase in valve opening angle of the intake valve and the exhaust valve.

With this control system, when the engine throttle takes its idle position with the result of turning on the idle switch 114, the valve timing mechanism 82 changes valve opening angles of the intake and exhaust valves to a greater side until an target reverse torque is attained for vehicle speeds V less than the threshold speed V1 while the engine 1 is in the fuel-cut mode. This provides a decrease in work of the piston, and consequently an increased effect of engine braking force caused due to fuel-cut is eliminated and appropriate engine braking force is kept.

Figure 22:
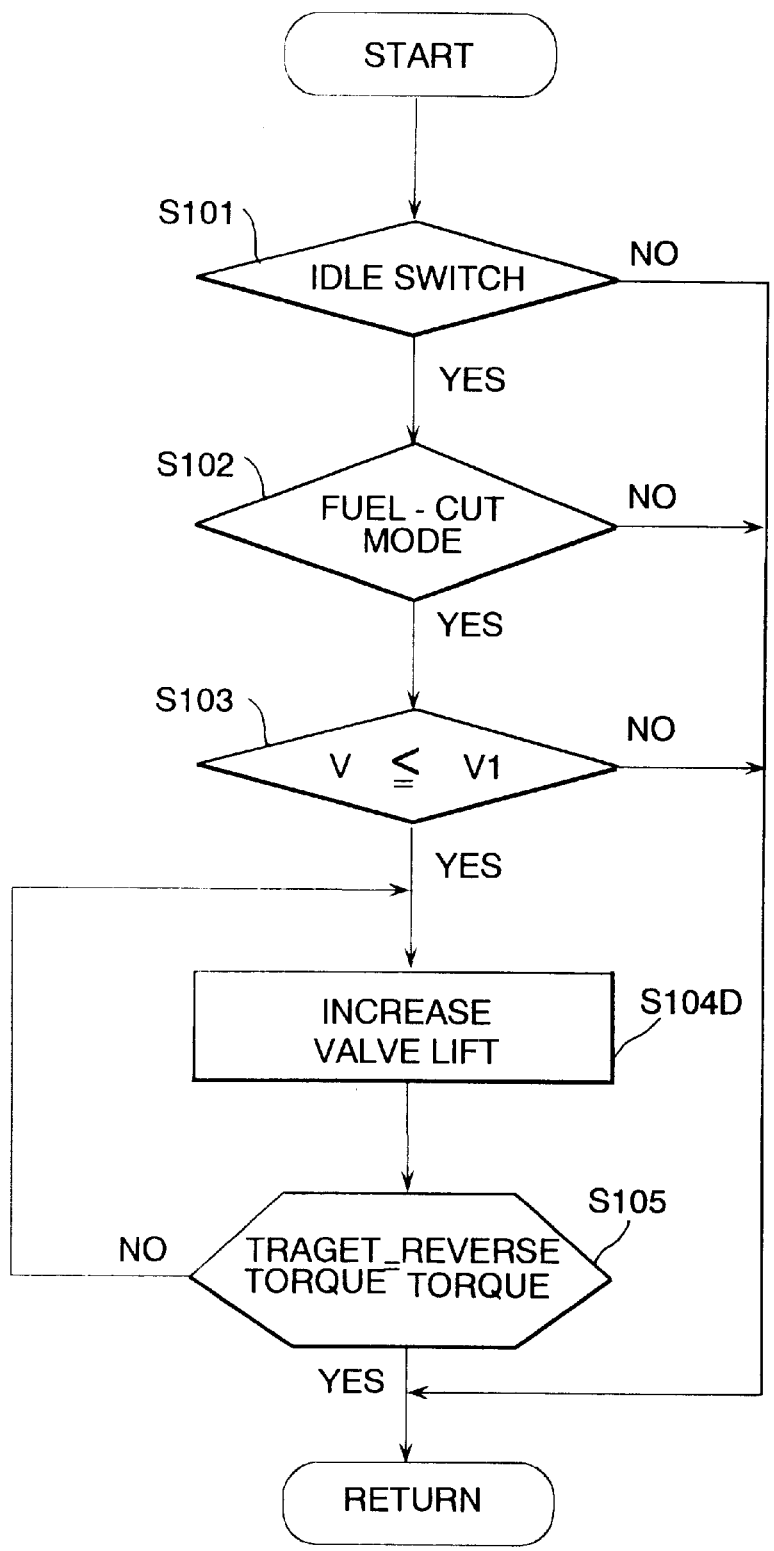
FIG. 22 is a flowchart illustrating another gear ratio control sequence routine.
Figure 23:
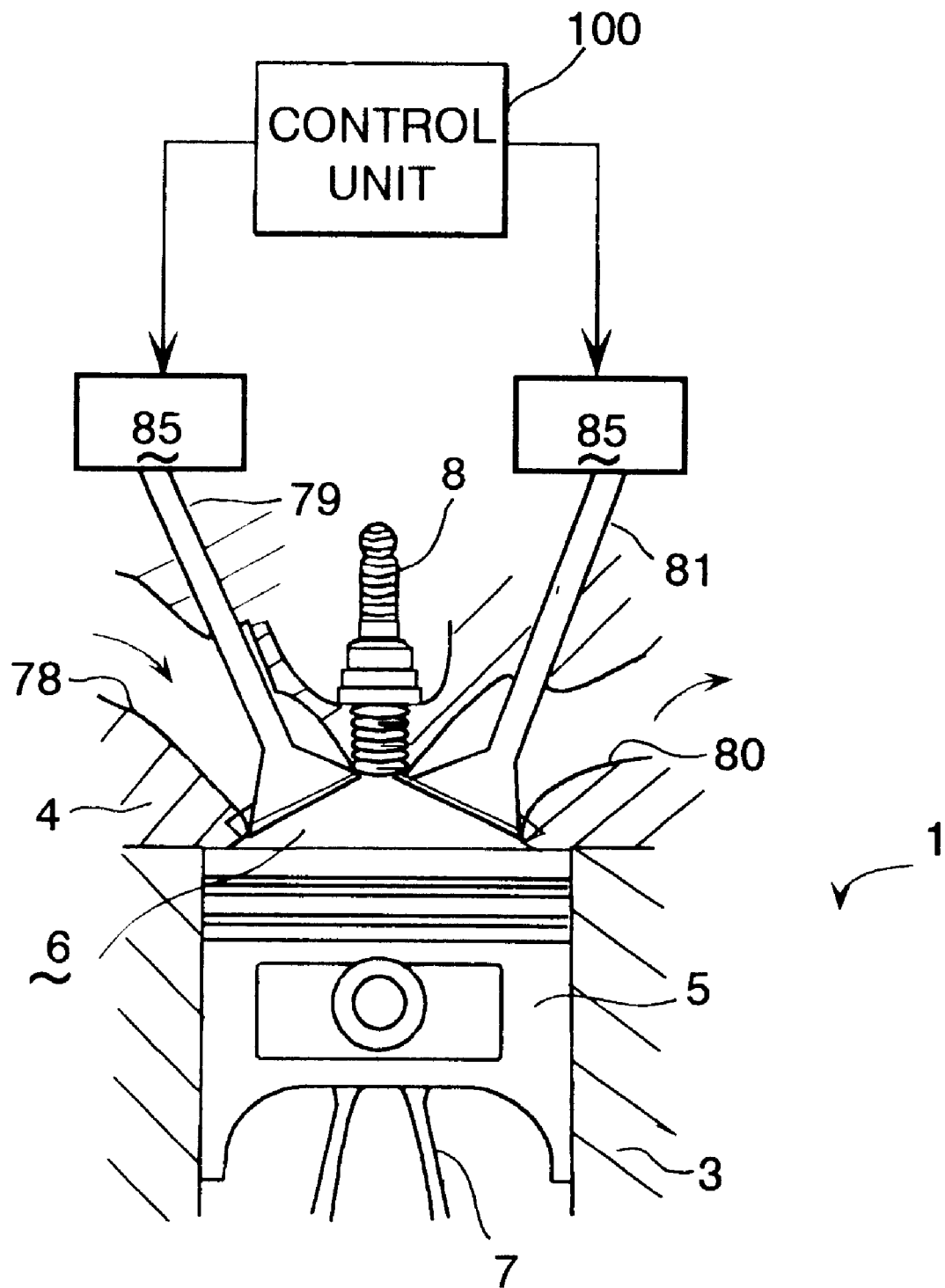
FIG. 23 is a schematic cross-sectional view of a variable valve lift mechanism.
Figure 24:
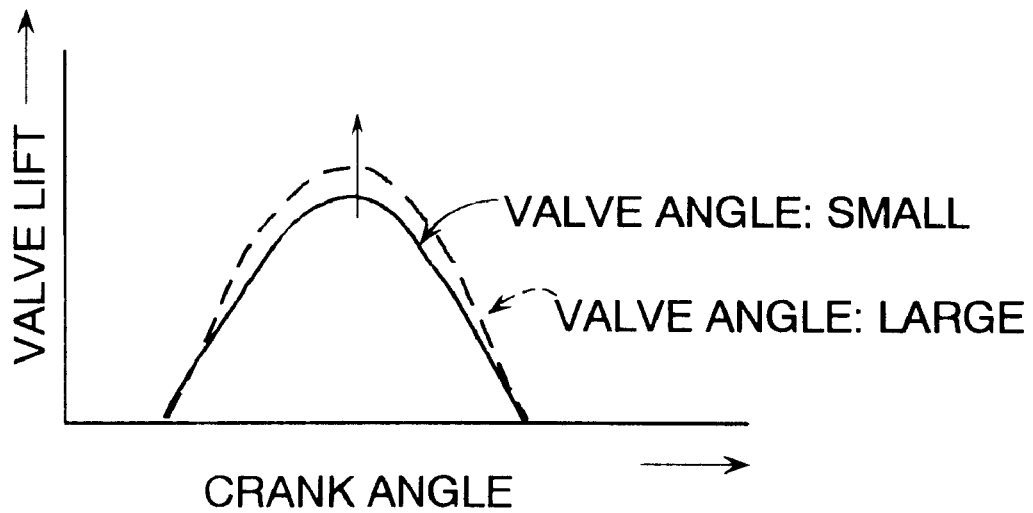
FIG. 24 is a characteristic diagram showing valve lift.

FIGS. 22 through 24 show an example of pumping loss varying control in which variable valve lift mechanisms 85 are used as an pumping loss varying means. As shown in FIG. 24, the variable valve lift mechanism 85 provides an increase in valve lift. The variable valve lift mechanism 82 is controlled to cause an increase in valve lift at step S104E in the pumping loss varying control sequential routine shown in FIG. 13.

Also with this control system, when the engine throttle takes its idle position with the result of turning on the idle switch 114, the variable valve lift mechanisms 82 increases valve lift of the intake valves and the exhaust valves to a greater side until an target reverse torque is attained for vehicle speeds V less than the threshold speed V1 while the engine 1 is in the fuel-cut mode. As a result, an increased effect of engine braking force caused due to fuel-cut is eliminated and appropriate engine braking force is kept.

Figure 25:
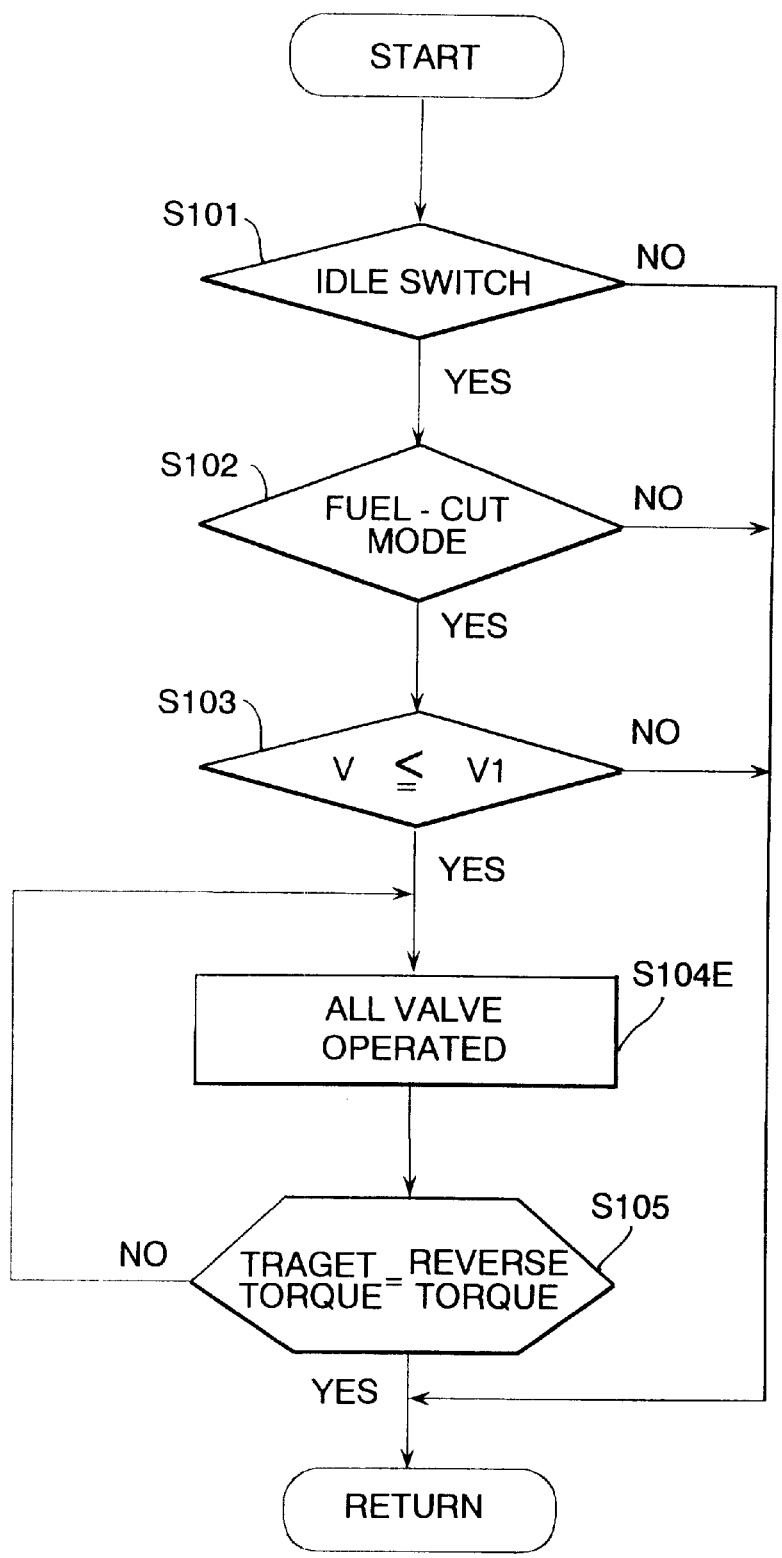
FIG. 25 is a flowchart illustrating another gear ratio control sequence routine.
Figure 26:
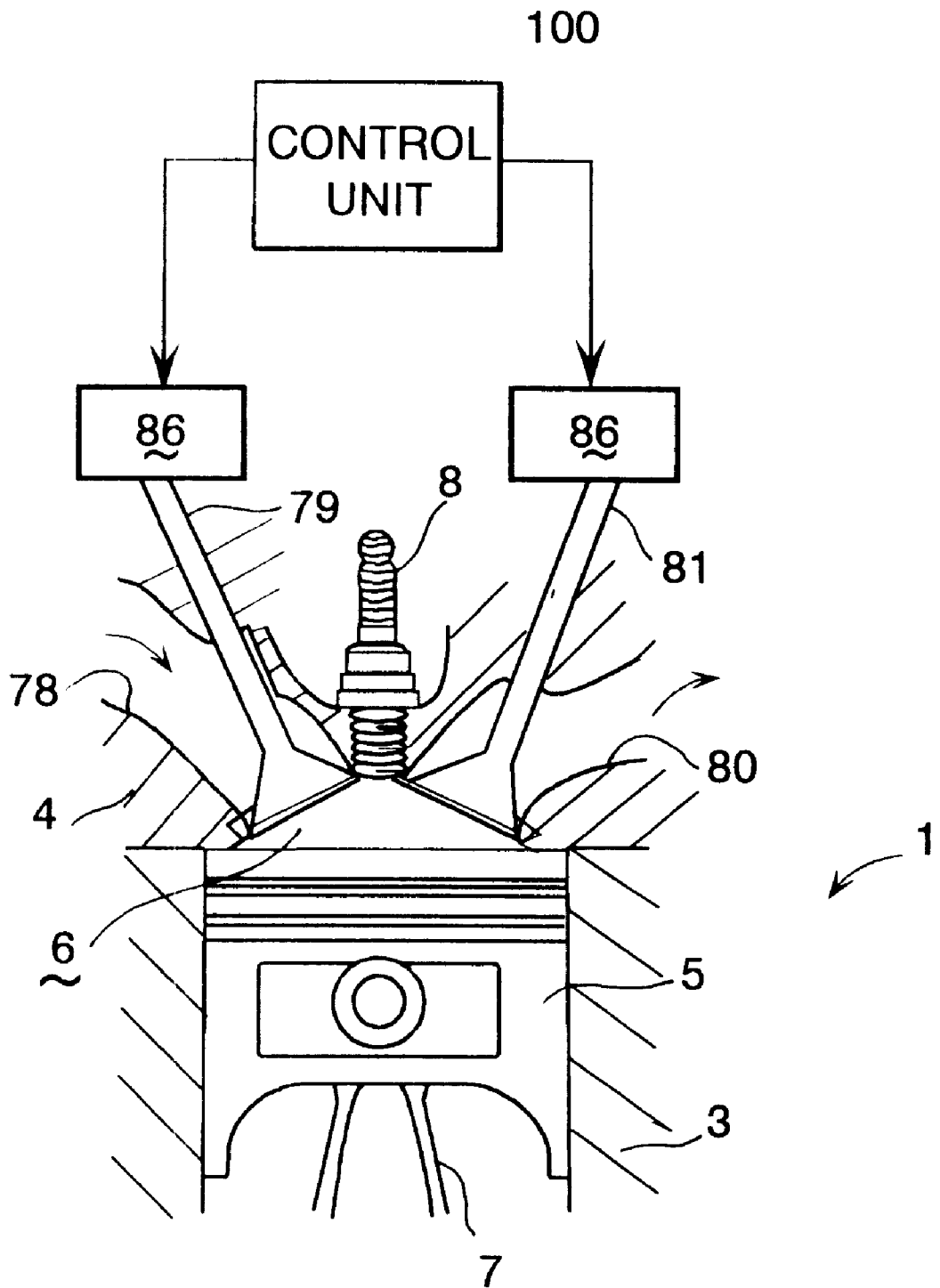
FIG. 26 is a schematic cross-sectional view of a valve stop mechanism.
Figure 27:
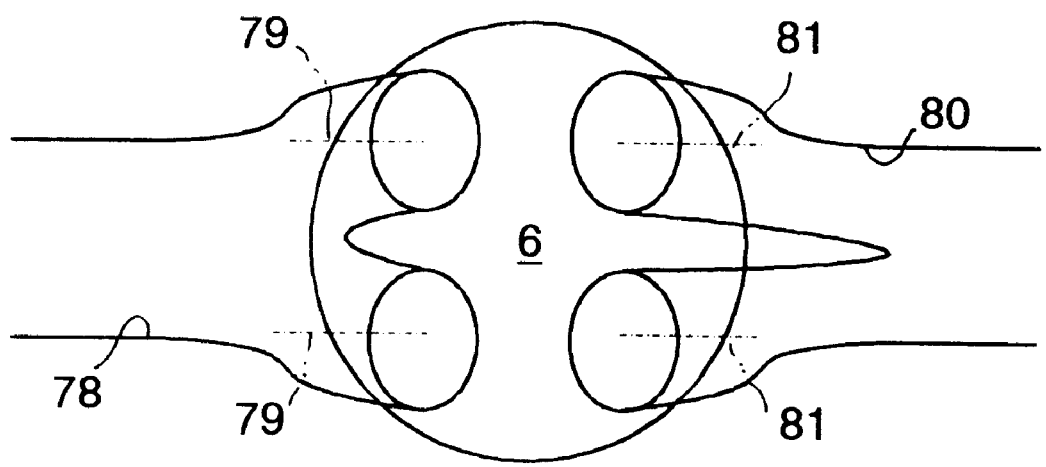
FIG. 27 is a schematic plan view of the valve stop mechanism of FIG. 26.

FIGS. 25 through 27 show an example of pumping loss varying control in which valve interrupt mechanisms 86 are used as an pumping loss varying means. As shown in FIG. 26, an intake port 78 at its downstream end adjacent to the engine cylinder and an exhaust port 80 at its upstream end adjacent to the engine cylinder are forked. The intake port 78 opens at the forked port end sections to the cylinder bore 6 and opened and shut by a pair of intake valves 79. Similarly, the exhaust port 80 opens at the forked port end sections to the cylinder bore 6 and opened and shut by a pair of exhaust valves 81. The valve interrupt mechanism 86 for intake ports is linked with either one of the intake valves 79 and controlled by the control unit 100 to interrupt operation of the related intake valve 79 while, for example, the engine 1 operates at low speeds. Similarly, the valve interrupt mechanism 86 for exhaust ports is linked with either one of the exhaust valves 81 and controlled by the control unit 100 to interrupt operation of the related exhaust valve 81 while, for example, the engine 1 operates at low speeds. The valve interrupt mechanisms 86 are controlled to allow both the related intake valves 79 and the related exhaust valves 81 to perform ordinary valve operation at step S104F in the pumping loss varying control sequential routine shown in FIG. 26.

Also with this control system, when the engine throttle takes its idle position with the result of turning on the idle switch 114, the valve interrupt mechanisms 86 do not interrupt operation of any valves until an target reverse torque is attained for vehicle speeds V less than the threshold speed V1 while the engine 1 is in the fuel-cut mode. As a result, an increased effect of engine braking force caused due to fuel-cut is eliminated and appropriate engine braking force is kept.

The mechanisms and mechanical elements used as the engine loss varying means themselves are well known in mechanism and operation in the art and may take any well known type.

Figure 28:
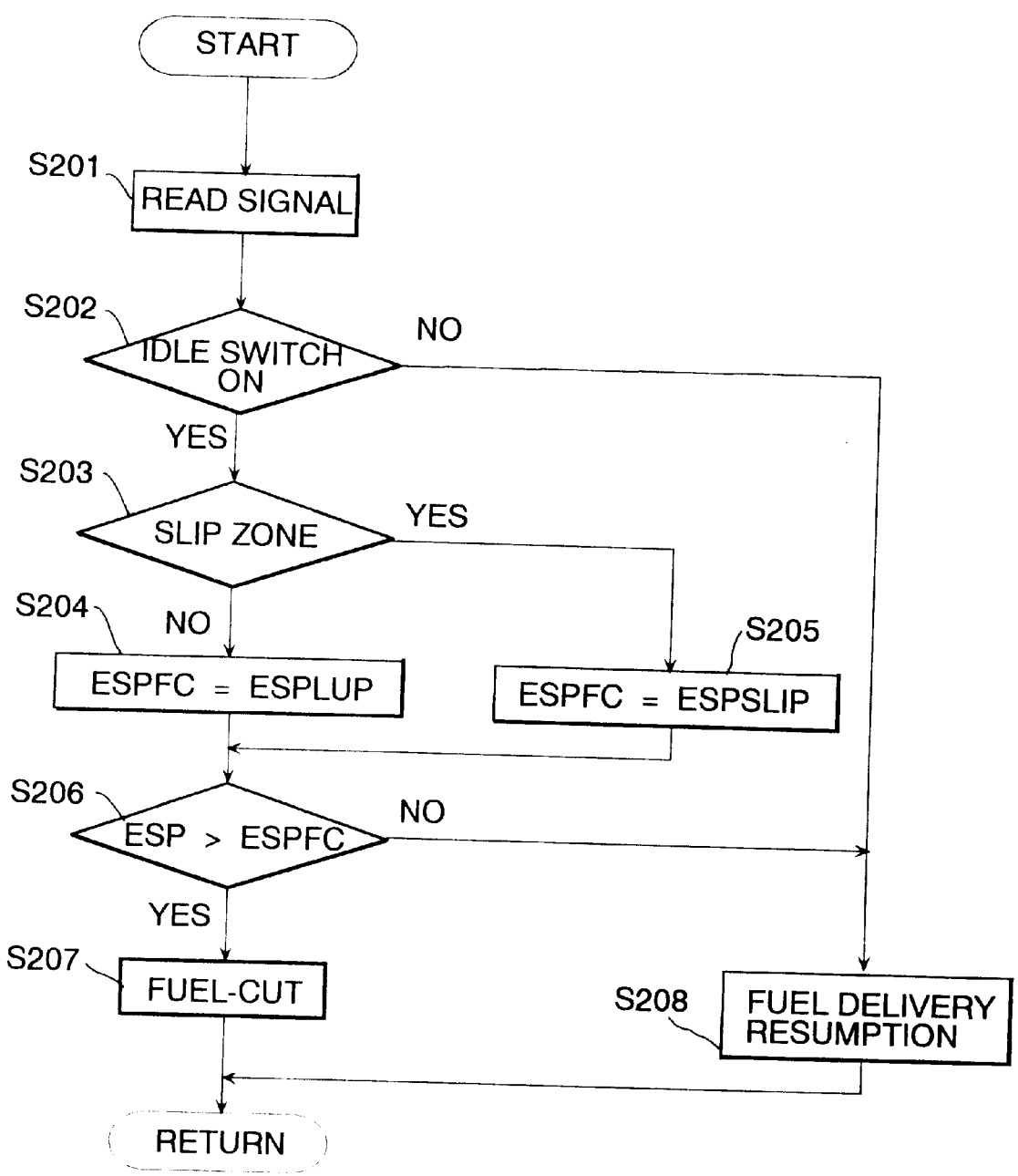
FIG. 28 is a flowchart illustrating another gear ratio control sequence routine.
Figure 29:
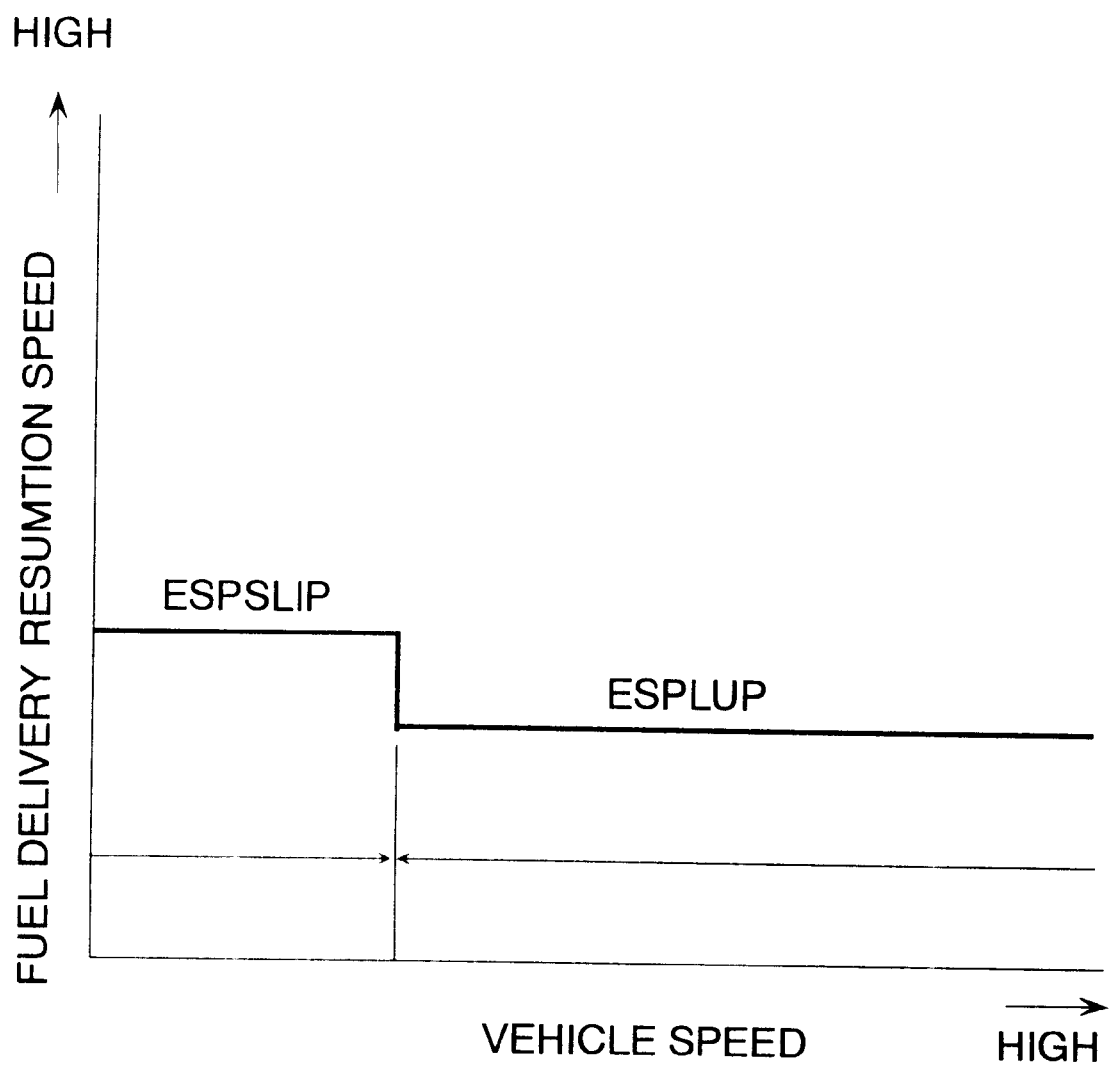
FIG. 29 is a characteristic diagram showing fuel delivery resumption engine speed.
Figure 30:
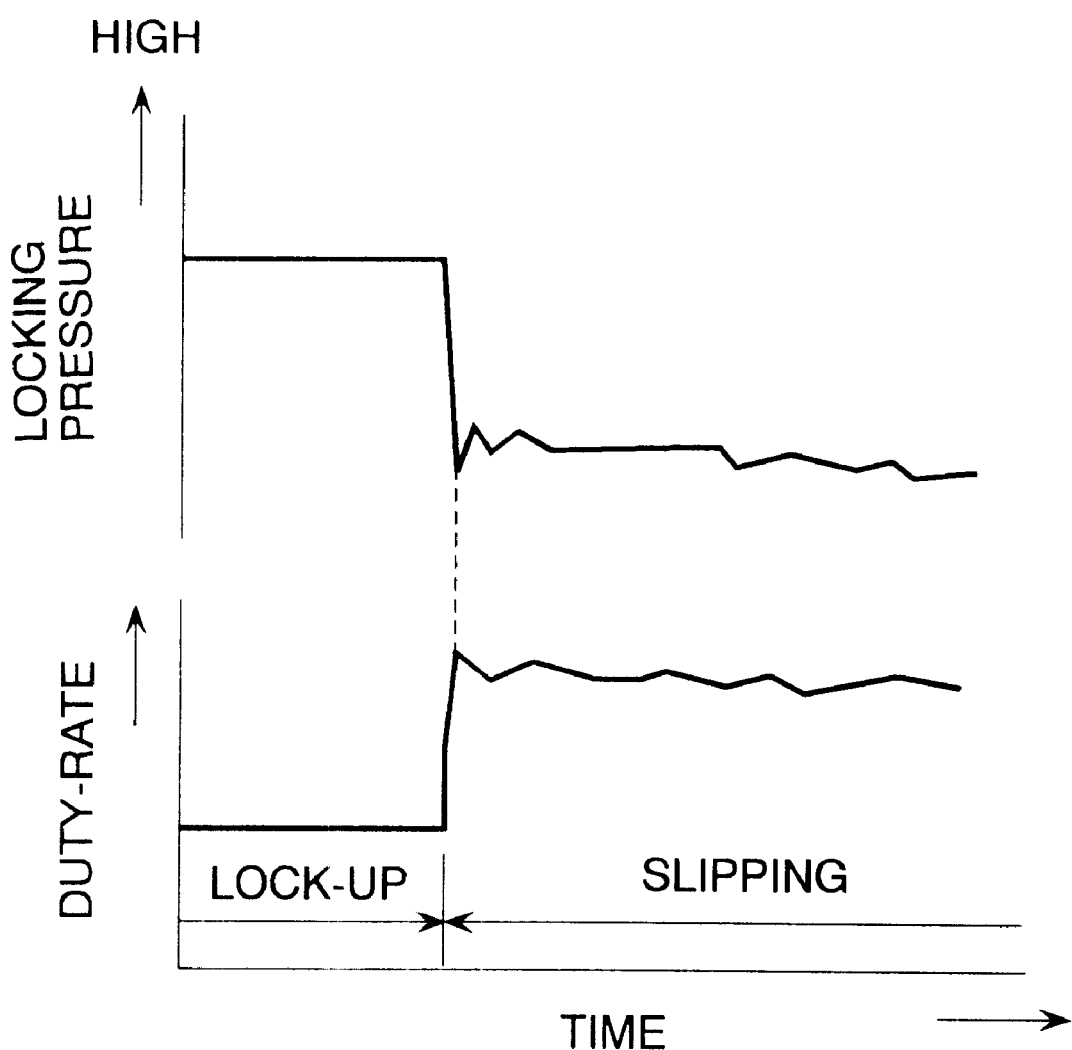
FIG. 30 is a characteristic diagram showing the responsiveness of clutch locking pressure.

FIGS. 28 through 30 show an automatic transmission control system according to another embodiment of the invention. An automatic transmission 12 in this embodiment is connected to an engine 1 by means of a torque converter equipped with a lockup clutch or otherwise by means of a wet clutch. The clutch (the lockup clutch or the wet clutch) is changed over between lockup condition and slipping condition by means of clutch locking pressure control which is performed through a duty solenoid valve (not shown) controlled by the control unit 100. This clutch locking pressure control is performed following the sequence routine shown by a flowchart in FIG. 28. When the flowchart logic commences and control proceeds directly to a function block at step S201 where various signals from the sensors and switches 101 through 114. Subsequently, determination is made based on the signals at step S202 as to whether or not the idle switch 114 remains turned on. When the idle switch is off, after resuming fuel delivery to the engine at step S208, the control returns for another cycle.

On the other hand, when the idle switch 114 remains turned on, another determination is subsequently made at stem S203 as to whether or not the clutch is in a slip zone. In place of the determination relating to the slip zone, it may be determined whether the vehicle speed is within a specific range of speeds. According to the result of the determination, the fuel delivery resumption engine speed ESPFC at which the fuel delivery is resumed is set to a lockup engine speed ESPLUP at step S204 when the answer is negative, or to a slipping engine speed ESPSLIP at step S205 which is higher than the lockup engine speed ESPLUP. The term "lockup engine speed" is referred to an engine speed while the clutch is locked up. The term "slipping engine speed" is referred to an engine speed while the clutch is slipping. After setting the fuel delivery resumption engine speed ESPFC at step S204 or step S205, a determination is made at step S206 as to whether or not the engine speed ESP is greater than the fuel delivery resumption engine speed ESPFC. the fuel-cut control is performed at step S207 when the engine speed ESP is greater than the fuel delivery resumption engine speed ESPFC, and thereafter, the control returns for another cycle. On the other hand, fuel delivery is resumed when the engine speed ESP is less than the fuel delivery resumption engine speed ESPFC and thereafter, the control returns for another cycle.

With this control system, when the idle switch 114 turns on, the fuel cut control or the resumption of fuel delivery is effected after setting the fuel delivery resumption engine speed ESPEC higher for vehicle speeds in the slip zone in which the clutch slips than for vehicle speeds out of the slip zone. Specifically, in the case where clutch locking pressure is regulated by a duty solenoid valve by feedforward control, since the clutch locking pressure possibly changes depending upon the temperature of hydraulic fluid and/or the locking force of the clutch depending upon the level of locking pressure changes due to aging of the clutch, it is hard to perform precise control of hydraulic pressure. On the other hand, in the case the locking pressure is feedback controlled, because the clutch locking pressure has hysteresis in response as shown in FIG. 30, there is an apprehension that the clutch pressure overshoots at the moment of a shift of the clutch from a locked state to a slipping state, which leads to an engine stall.

According to this embodiment of the invention, however, because the fuel delivery resumption engine speed ESPFC during slippage of the clutch is higher than the lockup engine speed ESPLUP, the engine is surly prevented from encountering an engine stall.

The automatic transmission control system of the invention can be applied to a pulley type of continuously variable automatic transmission as well. In place of detecting the engine throttle in the idle position by the idle switch 114, opening below a specified value may be detected.

Although the present invention has been fully described by way of example with reference to the accompanying drawings, it is to be understood that various changes and modifications may occur to those skilled in the art. Unless such changes and modifications otherwise depart from the scope of the invention, they are intended to be covered by the following claims.

What is claimed is:

1. An automatic transmission control system for controlling a gear ratio of an automatic transmission connected to an engine so as to bring an engine speed of rotation to a target speed of rotation predetermined according to a vehicle speed and a throttle opening of the engine, said control system comprising:

an engine speed sensor for detecting an engine speed of rotation of the engine;

throttle opening sensor for detecting a throttle opening of an throttle of the engine;

a vehicle speed sensor for detecting a vehicle speed; and control means for interrupting delivery of fuel to the engine while said engine speed of rotation is higher than a specified speed of rotation and said throttle opening is less than a specified opening, increasing said target engine speed of rotation while said throttle opening is less than said specified opening to increase said gear ratio and, when said throttle opening sensor detects a throttle opening increased above said specified opening after having once been decreased below said specified opening, said control means controls said gear ratio according to said increased target engine speed of rotation until a target engine speed of rotation set according to a vehicle speed and a throttle opening becomes over said increased target engine speed of rotation.

2. An automatic transmission control system as defined in claim 1, wherein said control means interrupts control of said gear ratio according to said increased target engine speed of rotation when said throttle opening is less than said specified opening after a predetermined duration of no detection of said throttle opening less than said specified opening.

3. An automatic transmission control system as defined in claim 1, and further comprising pumping loss control means for changing pumping loss of the engine, wherein said control means causes said pumping loss control means to provide a decrease in pumping loss of the engine when said throttle opening is less than said specified opening.

4. An automatic transmission control system as defined in claim 3, and further comprising a vehicle speed sensor for detecting a vehicle speed, wherein said control means causes said pumping loss control means to provide a decrease in pumping loss of the engine when said throttle opening is less than said specified opening and said vehicle speed is lower than a specified speed.

5. An automatic transmission control system for controlling a gear ratio of an automatic transmission connected to an engine so as to bring an engine speed of rotation to a target speed of rotation predetermined according to a vehicle speed and a throttle opening of the engine, said control system comprising:

an engine speed sensor for detecting an engine speed of rotation of the engine;

throttle opening sensor for detecting a throttle opening of an throttle of the engine;

control means for interrupting delivery of fuel to the engine while said engine speed of rotation is higher than a specified speed of rotation and said throttle opening is less than a specified opening, calculating a first target engine speed of rotation based on a vehicle speed and a throttle opening and a second target engine speed of rotation based on a vehicle speed which is made to yield an increase in engine speed of rotation during deceleration, and adopting said first target engine speed of rotation when said throttle opening sensor detects a throttle opening greater than a specified opening and said second target engine speed of rotation when said throttle opening sensor detects a throttle opening less than said specified opening.

6. An automatic transmission control system as defined in claim 5, wherein, when said throttle opening sensor detects a throttle opening increased above said specified opening after having once been decreased below said specified opening, said control means controls said gear ratio according to said second target engine speed of rotation until said first target engine speed of rotation becomes over said second target engine speed of rotation.

7. An automatic transmission control system as defined in claim 6, wherein said control means interrupts control of said gear ratio according to said second target engine speed of rotation when said throttle opening is less than said specified opening after a predetermined duration of no detection of said throttle opening less than said specified opening.

8. An automatic transmission control system as defined in claim 5, and further comprising pumping loss control means for changing pumping loss of the engine, wherein said control means causes said pumping loss control means to provide a decrease in pumping loss of the engine when said throttle opening is less than said specified opening.

9. An automatic transmission control system as defined in claim 8, and further comprising a vehicle speed sensor for detecting a vehicle speed, wherein said control means causes said pumping loss control means to provide a decrease in pumping loss of the engine when said throttle opening is less than said specified opening and said vehicle speed is lower than a specified speed.

10. An automatic transmission control system for controlling a gear ratio of a continuously variably automatic transmission including a toroidal gear mechanism disposed between an engine and drive wheels which comprises an input disk to which input torque is transmitted from the engine, an output disk from which output torque is transmitted to the drive wheels, a roller interposed between the input and the output disks, a support for supporting the roller for rotation and a hydraulic actuator operative to shift the roller in a direction tangential to the input and the output disks from a neutral position through the support to decline the roller so as thereby to vary a speed ratio of the input and the output disks, said automatic transmission control system comprising:

a shift valve for controlling hydraulic pressure supplied to said hydraulic actuator to cause said support to shift and incline said roller;

a fuel injector operative to deliver fuel; and an engine speed sensor for detecting an engine speed of rotation of the engine;

throttle opening sensor for detecting a throttle opening of an throttle of the engine;

a controller operative to control said shift valve and said fuel injector according to said engine speed of rotation and said throttle opening;

said controller, while determining a target engine speed of rotation according to said throttle opening on the basis of target engine speed characteristics predetermined according to throttle opening as a parameter to control said shift valve so as to bring said engine speed of rotation close to said target engine speed of rotation, controlling said fuel injector to interrupt delivery of fuel to the engine while said engine speed of rotation is higher than a specified speed of rotation and said throttle opening is less than a specified opening, increasing said target engine speed of rotation higher than said target engine speed of rotation determined according to said throttle opening to increase said gear ratio while said throttle opening is less than said specified opening and further, when said throttle opening sensor detects a throttle opening increased above said specified opening after having once been decreased below said specified opening, controlling said shift valve based on said increased target engine speed of rotation until said target engine speed of rotation determined according to said throttle opening based on said target engine speed characteristics becomes below said target engine speed of rotation increased when said throttle opening sensor detects a throttle opening increased above said specified opening.

11. An automatic transmission control system for controlling a gear ration of a continuously variably automatic transmission including a toroidal gear mechanism disposed between an engine and drive wheels which comprises an input disk to which input torque is transmitted from the engine, an output disk from which output torque is transmitted to the drive wheels, a roller interposed between the input and the output disks, a support for supporting the roller for rotation and a hydraulic actuator operative to shift the roller in a direction tangential to the input and the output disks from a neutral position through the support to decline the roller so as thereby to vary a speed ratio of the input and the output disks, said automatic transmission control system comprising:

an engine speed sensor operative to detect an engine speed of rotation of the engine;

a throttle opening sensor operative to detect a throttle opening of an throttle of the engine;

a vehicle speed sensor operative to detect a vehicle speed; and a controller operative to control said shift valve and said fuel injector according to said engine speed of rotation and said throttle opening;

said controller determining a first target engine speed of rotation according to said throttle opening and said vehicle speed on the basis of target engine speed characteristics predetermined according to throttle opening and vehicle speed as parameters, determining a second target engine speed of rotation based on said vehicle speed detected by said vehicle speed sensor which is made to yield an increase in engine speed of rotation during deceleration, controlling said fuel injector to interrupt delivery of fuel to the engine while said engine speed sensor detects an engine speed of rotation is higher than a specified speed of rotation and said throttle opening sensor detects throttle opening less than a specified opening, and controlling said shift valve to bring said engine speed of rotation detected by said engine speed sensor close to said first target engine speed of rotation while said throttle opening sensor detects throttle opening greater than said specified opening and to bring said engine speed of rotation detected by said engine speed sensor close to said second target engine speed of rotation while said throttle opening sensor detects throttle opening less than said specified opening.

* * * * *